US008325799B2

(12) United States Patent
Chono et al.

(10) Patent No.: US 8,325,799 B2
(45) Date of Patent: Dec. 4, 2012

(54) MOVING PICTURE ENCODING METHOD, DEVICE USING THE SAME, AND COMPUTER PROGRAM

(75) Inventors: Keiichi Chono, Tokyo (JP); Yuzo Senda, Tokyo (JP)

(73) Assignee: NEC Corporation, Tokyo (JP)

( * ) Notice: Subject to any disclaimer, the term of this patent is extended or adjusted under 35 U.S.C. 154(b) by 1477 days.

(21) Appl. No.: 11/794,142

(22) PCT Filed: Dec. 27, 2005

(86) PCT No.: PCT/JP2005/023862

§ 371 (c)(1), (2), (4) Date: Jun. 26, 2007

(87) PCT Pub. No.: WO2006/070787

PCT Pub. Date: Jul. 6, 2006

(65) Prior Publication Data

US 2008/0101465 A1 May 1, 2008

(30) Foreign Application Priority Data

Dec. 28, 2004 (JP) ................................ 2004-379778

(51) Int. Cl.
*H04N 7/12* (2006.01)

(52) U.S. Cl. ..................... 375/240.03; 375/240; 375/13; 375/16

(58) Field of Classification Search .................. 375/240, 375/240.13, 240.16; 380/255–276
See application file for complete search history.

(56) References Cited

U.S. PATENT DOCUMENTS

| | | | | |
|---|---|---|---|---|
| 5,410,350 | A * | 4/1995 | Kato et al. | 348/400.1 |
| 5,825,419 | A | 10/1998 | Mishima et al. | |
| 6,208,689 | B1 | 3/2001 | Ohira et al. | |
| 6,243,421 | B1 | 6/2001 | Nakajima et al. | |
| 6,574,275 | B1 | 6/2003 | Katayama | |
| 6,831,947 | B2 | 12/2004 | Ribas Corbera | |
| 6,862,319 | B2 | 3/2005 | Wu | |
| 6,898,323 | B2 | 5/2005 | Schwartz et al. | |
| 6,898,325 | B2 | 5/2005 | Gormish | |
| 6,904,178 | B2 | 6/2005 | Boliek et al. | |
| 6,973,217 | B2 | 12/2005 | Boliek et al. | |
| 6,983,075 | B2 | 1/2006 | Schwartz et al. | |

(Continued)

FOREIGN PATENT DOCUMENTS

EP 0687111 A2 6/1995

(Continued)

OTHER PUBLICATIONS

Yankun Wei, Wael Badawy; On Reducing the Inter Frame Rate: An Embedded Residual Image Model for Mesh-Based Motion Tracking; 2002; Image Processing. 2002. Preceeding. 2002 International Conference; vol. 1.*

(Continued)

*Primary Examiner* — Christopher Brown
*Assistant Examiner* — Fahimeh Mohammadi
(74) *Attorney, Agent, or Firm* — Foley & Lardner LLP

(57) ABSTRACT

If a reference frame displayed at the reproduction side immediately before a current image frame to be encoded is an inter encoding image frame, a quantization control device (999) appropriately corrects the level (quantization value) of an intra encoding so as to visually reduce I-frame flicker caused by a difference between the inter encoding noise characteristic of the inter encoding image frame and the noise characteristic of the current intra encoding.

38 Claims, 28 Drawing Sheets

IMAGE FRAME
MB BUFFER
101
I-FRAME FLICKERING SUPPRESSION CONTROL
300
BIT-RATE CONTROL
106
SIGNAL①
SIGNAL②
SIGNAL③
PREDICTIVE ERROR
QUANTIZING PARAMETER
CONVERSION/ QUANTIZATION
200
LEVEL
INVERSE-QUANTIZATION/ INVERSE-CONVERSION
104
RECONSTRUCTED PREDICTIVE ERROR
RECONSTRUCTED FRAME
INTER-FRAME PREDICTED VALUE
INTRA-FRAME PREDICTED VALUE
PREDICTED VALUE
SW100
INTRA-FRAME PREDICTION
110
INTER-FRAME PREDICTION
111
FRAME MEMORY A
107
IN-LOOP FILTER
108
REFERENCE FRAME
FRAME MEMORY B
109
ENTROPY ENCODING
105
BIT STREAM
MOTION VECTOR/ MB TYPE/ INTRA-FRAME PREDICTING DIRECTION
112
PREDICTING SCHEME ESTIMATION
SIGNAL①: CORRECTED REFERENCE IMAGE
SIGNAL②: I-FRAME FLICKERING SUPPRESSION CONTROL SIGNAL
SIGNAL③: REFERENCE PREDICTIVE ERROR
MOTION VECTOR ESTIMATION CONTROL SIGNAL

U.S. PATENT DOCUMENTS

| | | | | |
|---|---|---|---|---|
| 7,031,537 | B2 | 4/2006 | Schwartz et al. | |
| 7,062,103 | B2 | 6/2006 | Schwartz | |
| 7,142,722 | B2 | 11/2006 | Fukuhara et al. | |
| 7,164,804 | B2 | 1/2007 | Boliek et al. | |
| 7,336,720 | B2 * | 2/2008 | Martemyanov et al. | 375/240.12 |
| 7,643,690 | B2 * | 1/2010 | Suzuki et al. | 382/236 |
| 2002/0077812 | A1 * | 6/2002 | Suzuki et al. | 704/230 |
| 2003/0007692 | A1 * | 1/2003 | Chujoh et al. | 382/233 |
| 2003/0113025 | A1 * | 6/2003 | Bard et al. | 382/239 |
| 2004/0105491 | A1 * | 6/2004 | Bayazit | 375/240.01 |
| 2004/0131267 | A1 * | 7/2004 | Adiletta et al. | 382/236 |
| 2005/0265450 | A1 * | 12/2005 | Raveendran et al. | 375/240.15 |
| 2005/0276323 | A1 * | 12/2005 | Martemyanov et al. | 375/240.03 |
| 2006/0098738 | A1 * | 5/2006 | Cosman et al. | 375/240.16 |
| 2006/0104360 | A1 * | 5/2006 | Gordon | 375/240.16 |
| 2008/0317246 | A1 * | 12/2008 | Manders et al. | 380/37 |

FOREIGN PATENT DOCUMENTS

| | | | |
|---|---|---|---|
| JP | 05-111012 | | 4/1993 |
| JP | 5-236461 | A | 9/1993 |
| JP | 8-116539 | A | 5/1996 |
| JP | 08-251593 | | 9/1996 |
| JP | 9-98429 | A | 4/1997 |
| JP | 9-224250 | A | 8/1997 |
| JP | 9-247673 | A | 9/1997 |
| JP | 9-261635 | A | 10/1997 |
| JP | 10-98731 | A | 4/1999 |
| JP | 2000-23169 | A | 1/2000 |
| JP | 2000-165861 | A | 6/2000 |
| JP | 2000-165875 | A | 6/2000 |
| JP | 2002-335527 | | 11/2002 |
| JP | 2002-359850 | | 12/2002 |
| JP | 2003-235042 | | 8/2003 |
| JP | 2005-039321 | | 2/2005 |
| JP | 2005-318468 | | 11/2005 |
| JP | 2005-323315 | | 11/2005 |
| JP | 2005-348008 | | 12/2005 |
| KR | 2004-0036487 | | 4/2004 |
| WO | WO 03/088658 | A2 | 10/2003 |
| WO | WO 2005/117449 | A1 | 12/2005 |

OTHER PUBLICATIONS

Christopher Veaux, Pascal Scalart, Andre Gilloire; Channel Decoding using Inter- and Intra-correlation of Source Encoded Frames; 2000; Data Compression Conference, 2000. Preceedings. DCC 2000; pp. 1-10.*

M. A. Bowers, D. M. Monro; Optimum Intra/Inter Partitioning for Video Compression in the Wavelet Domain; 2001; Image Processing; 2001. Preceedings. 2001 International Conference; pp. 1-4.*

S. Sakaida et al., "Adaptive Quantization Control for Reducing Flicker of AVC/H.264 Intra Frames," Picture Coding Symposium, Dec. 15, 2004, XP030080123, San Francisco, CA.

Iguchi et al., "A Study of Reducing Flicker of H.264 in Intra Mode Coding," Forum on Information Technology, vol. 3, Aug. 25, 2003, pp. 277-278.

Sakaida et al, "Adaptive Quantization Control for Reducing Flicker of AVC/H.264 Intra Frames," vol. 3, Aug. 20, 2004, pp. 225-227.

* cited by examiner t-1
t
t+1
TIME
176
144
0
1
2
3
IMAGE FRAME (QCIF)
16
16
0 1 2 3
4 5 6 7
8 9 10 11
12 13 14 15
MB
4
4
j
i
4 x 4 BLOCK

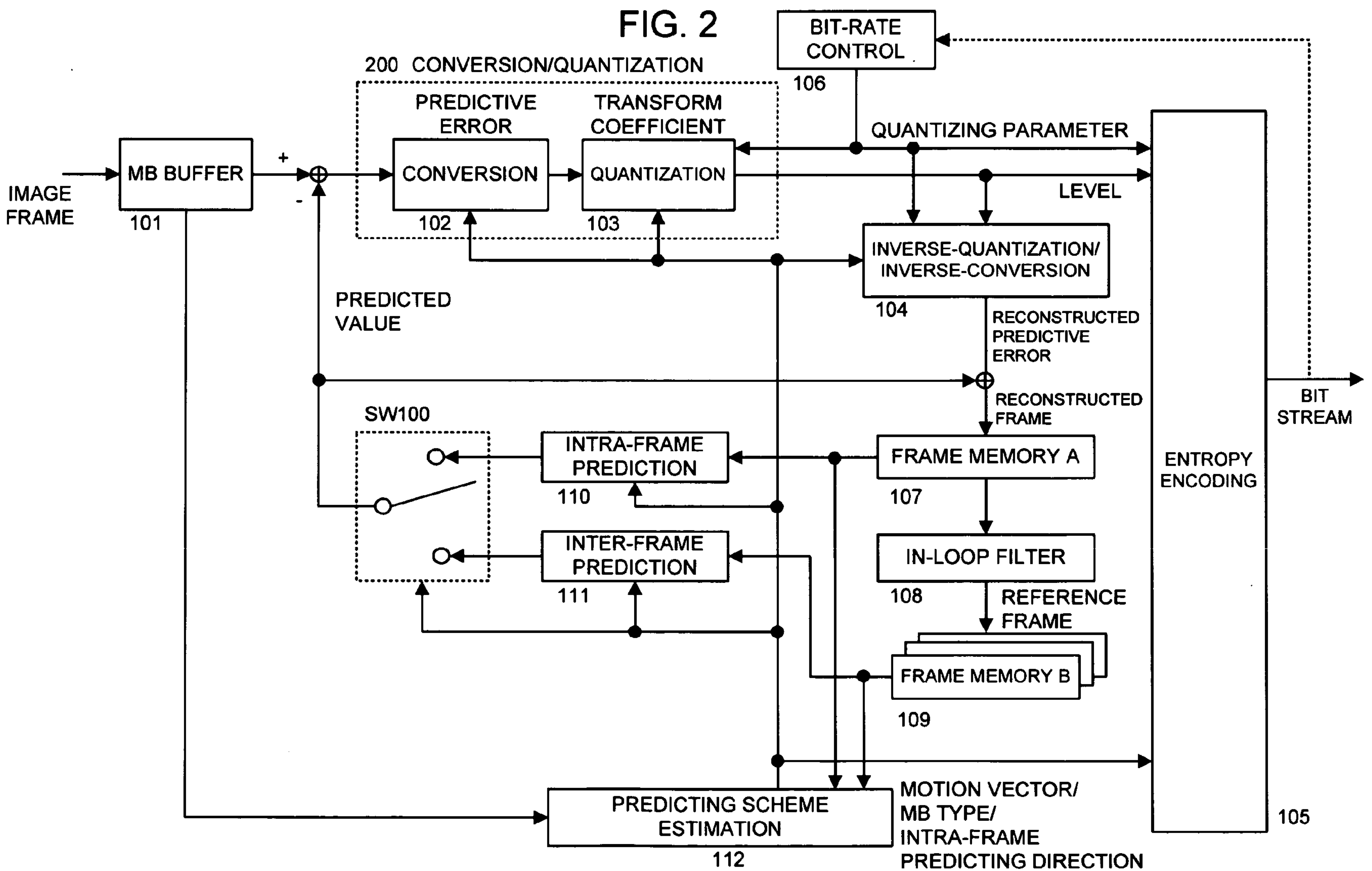
FIG. 2
200 CONVERSION/QUANTIZATION
IMAGE FRAME
MB BUFFER
101
+
-
PREDICTIVE ERROR
CONVERSION
102
TRANSFORM COEFFICIENT
QUANTIZATION
103
BIT-RATE CONTROL
106
QUANTIZING PARAMETER
LEVEL
INVERSE-QUANTIZATION/ INVERSE-CONVERSION
104
RECONSTRUCTED PREDICTIVE ERROR
RECONSTRUCTED FRAME
PREDICTED VALUE
SW100
INTRA-FRAME PREDICTION
110
INTER-FRAME PREDICTION
111
FRAME MEMORY A
107
IN-LOOP FILTER
108
REFERENCE FRAME
FRAME MEMORY B
109
ENTROPY ENCODING
105
BIT STREAM
PREDICTING SCHEME ESTIMATION
112
MOTION VECTOR/ MB TYPE/ INTRA-FRAME PREDICTING DIRECTION FIG. 3
PICTURE TYPE (I: I-PICTURE, P: P-PICTURE)
SEQUENCE OF DISPLAY
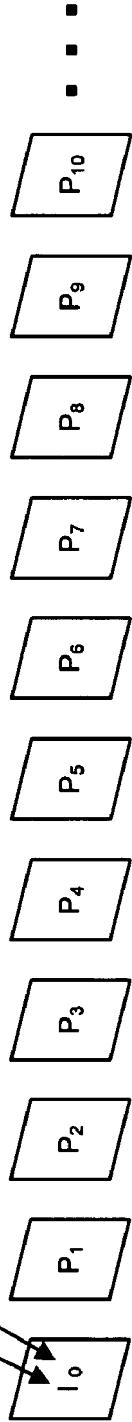
(A) I-PICTURE ONLY AT THE TOP (PARTIAL REPLAY STARTING FROM SOME MIDPOINT IS NOT POSSIBLE)
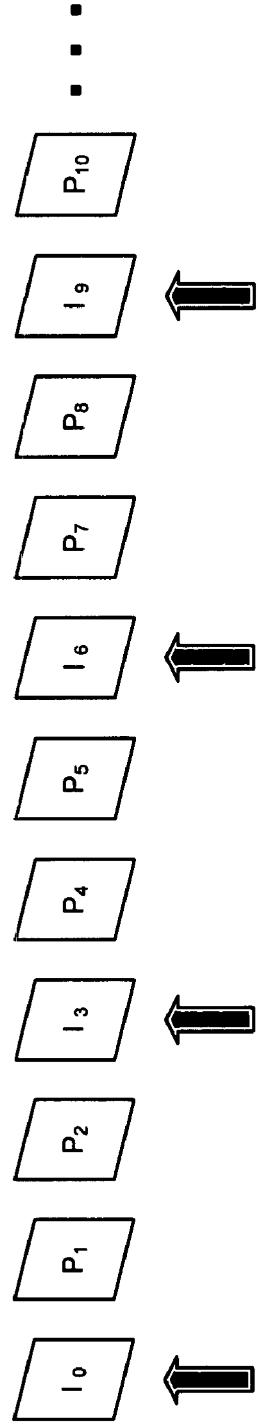
(B) I-PICTURE CYCLICALLY INSERTED (PARTIAL REPLAY STARTING FROM SOME MIDPOINT IS POSSIBLE)

INTER-FRAME PREDICTION
INTRA-FRAME PREDICTION
CONTINUOUS
DISCONTINUOUS
CONTINUOUS
$P_{t-1}$
$I_t$
$P_{t+1}$

200 CONVERSION/QUANTIZATION
102 CONVERSION
103 QUANTIZATION
1021
2D CONVERSION
PREDICTIVE ERROR
TRANSFORM COEFFICIENT
1031
QUANTIZATION OF COEFFICIENT
QUANTIZING PARAMETER
LEVEL
SW1023
1022
DC 2D CONVERSION
DC TRANSFORM COEFFICIENT
1032
QUANTIZATION OF DC COEFFICIENT
DC LEVEL
MB TYPE

VERTICAL PREDICTION
(pred4dir=0)
HORIZONTAL PREDICTION
(pred4dir=1)
AVERAGE VALUE
DC PREDICTION
(pred4dir=2)
45° PREDICTION
(pred4dir=3)
-45° PREDICTION
(pred4dir=4)
-22.5° PREDICTION
(pred4dir=5)
-67.5° PREDICTION
(pred4dir=6)
22.5° PREDICTION
(pred4dir=7)
-112.5° PREDICTION
(pred4dir=8)

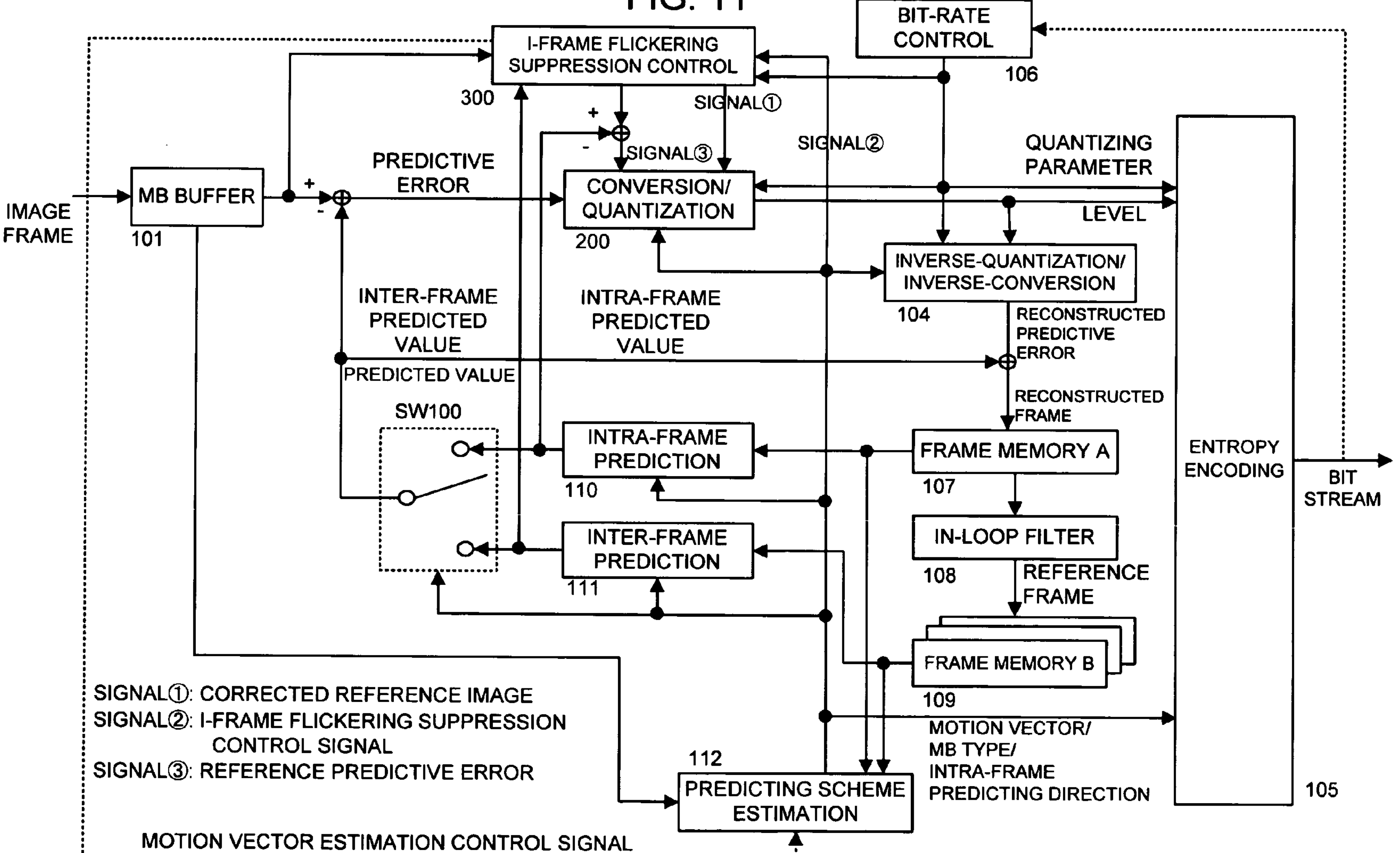
FIG. 11
IMAGE FRAME
MB BUFFER
101
PREDICTIVE ERROR
I-FRAME FLICKERING SUPPRESSION CONTROL
300
SIGNAL①
SIGNAL②
SIGNAL③
CONVERSION/ QUANTIZATION
200
BIT-RATE CONTROL
106
QUANTIZING PARAMETER
LEVEL
INVERSE-QUANTIZATION/ INVERSE-CONVERSION
104
RECONSTRUCTED PREDICTIVE ERROR
RECONSTRUCTED FRAME
INTER-FRAME PREDICTED VALUE
INTRA-FRAME PREDICTED VALUE
PREDICTED VALUE
SW100
INTRA-FRAME PREDICTION
110
INTER-FRAME PREDICTION
111
FRAME MEMORY A
107
IN-LOOP FILTER
108
REFERENCE FRAME
FRAME MEMORY B
109
ENTROPY ENCODING
105
BIT STREAM
MOTION VECTOR/ MB TYPE/ INTRA-FRAME PREDICTING DIRECTION
PREDICTING SCHEME ESTIMATION
112
SIGNAL①: CORRECTED REFERENCE IMAGE
SIGNAL②: I-FRAME FLICKERING SUPPRESSION CONTROL SIGNAL
SIGNAL③: REFERENCE PREDICTIVE ERROR
MOTION VECTOR ESTIMATION CONTROL SIGNAL 300 I-FRAME FLICKERING SUPPRESSION CONTROL
CORRECTED REFERENCE IMAGE
QUANTIZING PARAMETER
MOTION VECTOR/ MB TYPE
I-FRAME FLICKERING SUPPRESSION CONTROL SIGNAL
104
INVERSE-QUANTIZATION/ INVERSE-CONVERSION
103
QUANTIZATION
102
CONVERSION
PREDICTIVE ERROR
CONTROLLER
301
MOTION VECTOR ESTIMATION CONTROL SIGNAL
+
-
INPUT MB
INTER-FRAME PREDICTED VALUE

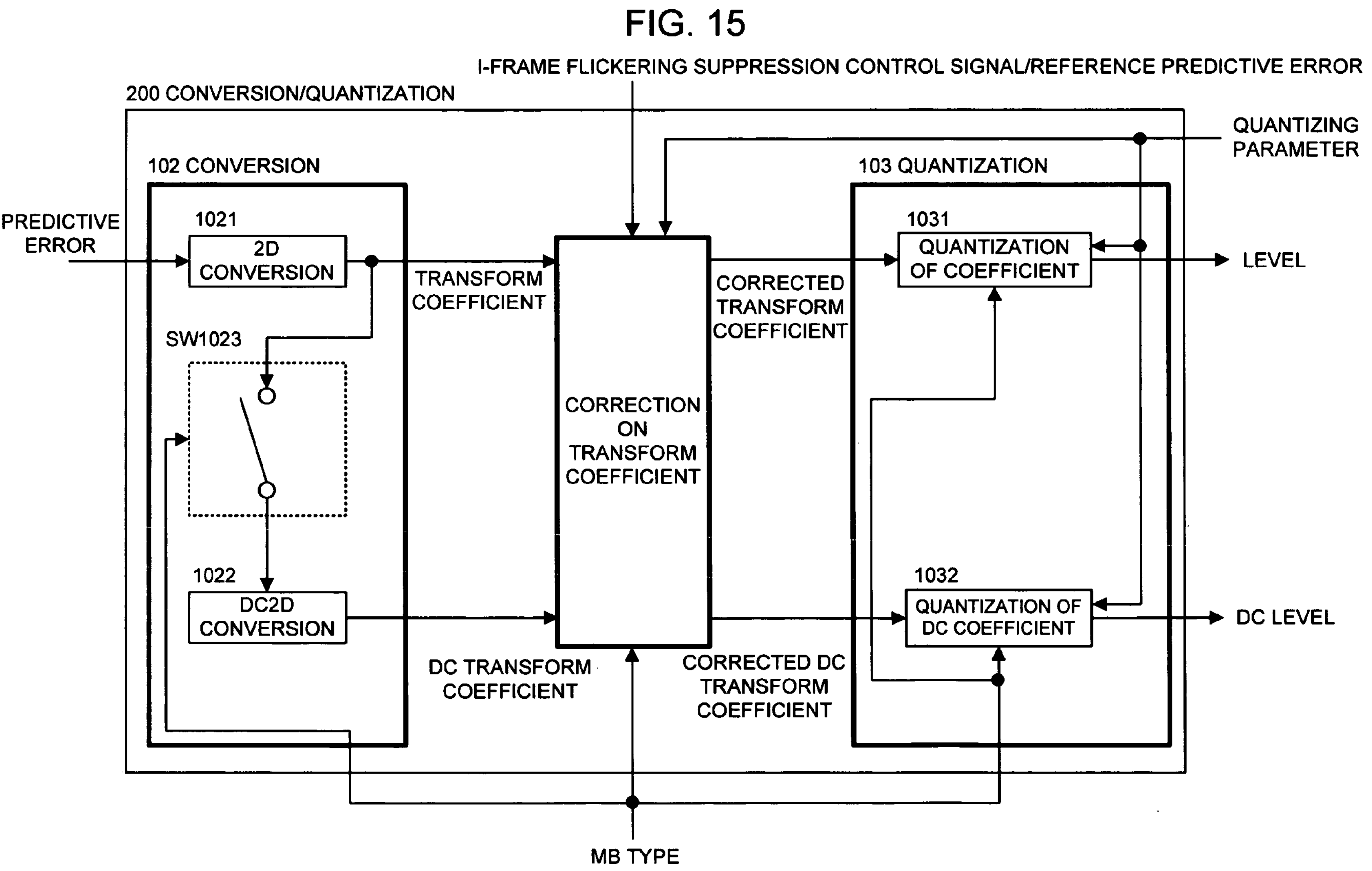
FIG. 15
I-FRAME FLICKERING SUPPRESSION CONTROL SIGNAL/REFERENCE PREDICTIVE ERROR
200 CONVERSION/QUANTIZATION
QUANTIZING PARAMETER
102 CONVERSION
103 QUANTIZATION
PREDICTIVE ERROR
1021
2D CONVERSION
TRANSFORM COEFFICIENT
CORRECTED TRANSFORM COEFFICIENT
1031
QUANTIZATION OF COEFFICIENT
LEVEL
SW1023
CORRECTION ON TRANSFORM COEFFICIENT
1022
DC2D CONVERSION
1032
QUANTIZATION OF DC COEFFICIENT
DC LEVEL
DC TRANSFORM COEFFICIENT
CORRECTED DC TRANSFORM COEFFICIENT
MB TYPE PIXEL VALUE
NO STEEP VARIATION IN PIXEL VALUE OF PIXEL OF INTEREST
CORRECTED REFERENCE IMAGE
INPUT
RECONSTRUCTED
PREDICTED
REFERENCE PREDICTIVE ERROR
PREDICTIVE ERROR
RECONSTRUCTED PREDICTIVE ERROR
$I_0$
$P_1$
$P_2$
$I_3$
$P_4$
$P_5$
$I_6$
$P_7$
$P_8$

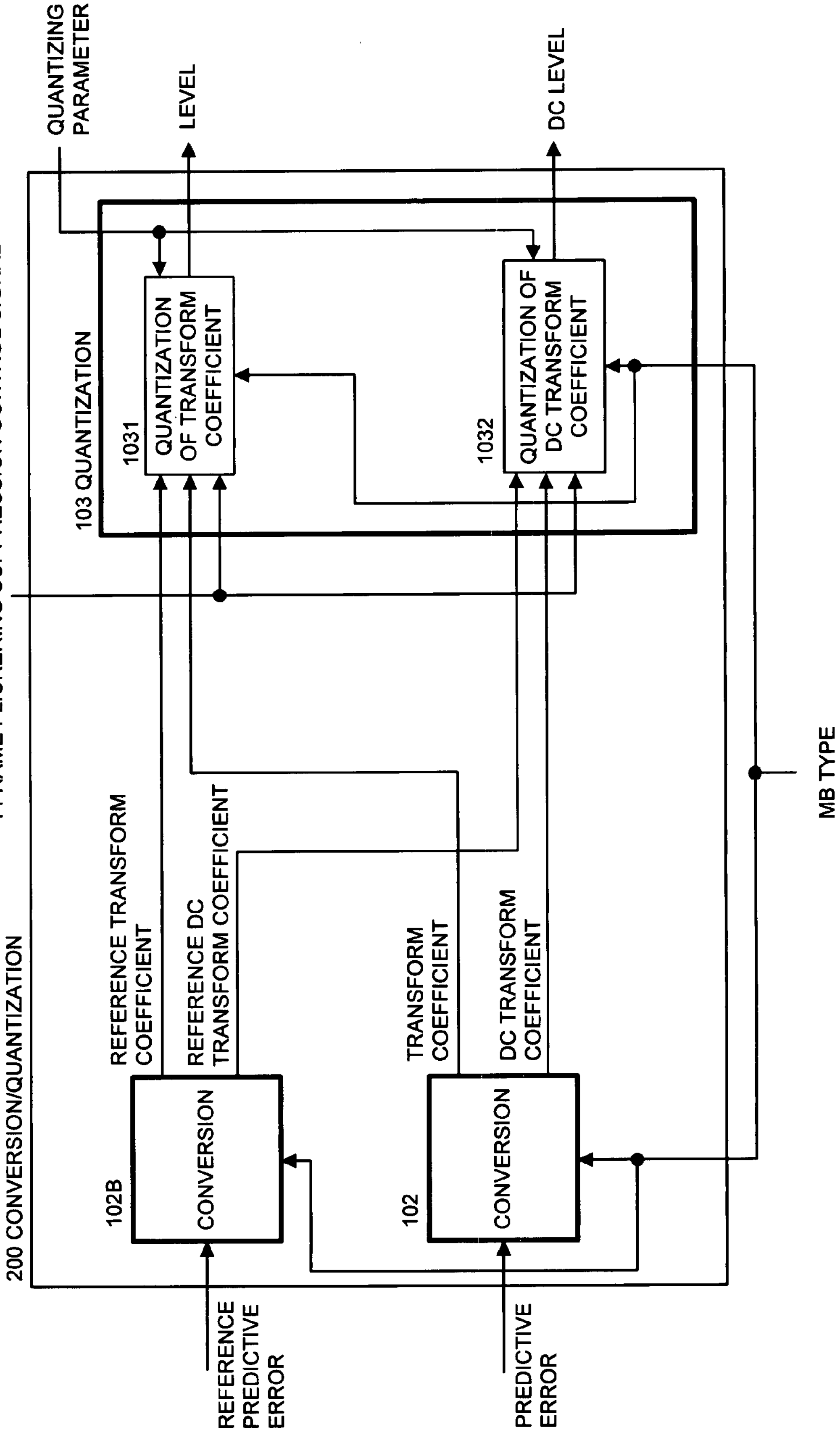
FIG. 20
I-FRAME FLICKERING SUPPRESSION CONTROL SIGNAL
QUANTIZING PARAMETER
LEVEL
DC LEVEL
103 QUANTIZATION
1031
QUANTIZATION OF TRANSFORM COEFFICIENT
1032
QUANTIZATION OF DC TRANSFORM COEFFICIENT
200 CONVERSION/QUANTIZATION
REFERENCE TRANSFORM COEFFICIENT
REFERENCE DC TRANSFORM COEFFICIENT
TRANSFORM COEFFICIENT
DC TRANSFORM COEFFICIENT
102B
CONVERSION
102
CONVERSION
MB TYPE
REFERENCE PREDICTIVE ERROR
PREDICTIVE ERROR 200 CONVERSION/QUANTIZATION
QUANTIZING PARAMETER
LEVEL
DC LEVEL
103
QUANTIZATION
TRANSFORM COEFFICIENT
DC TRANSFORM COEFFICIENT
102
CONVERSION
MB TYPE
CORRECTED PREDICTIVE ERROR
202
CORRECTION ON PREDICTIVE ERROR
PREDICTIVE ERROR
I-FRAME FLICKERING SUPPRESSION CONTROL SIGNAL/ REFERENCE PREDICTIVE ERROR A1003
IMAGE
IMAGE
A1001
PROCESSOR
A1002
PROGRAM MEMORY
BIT STREAM
BIT STREAM
A1004

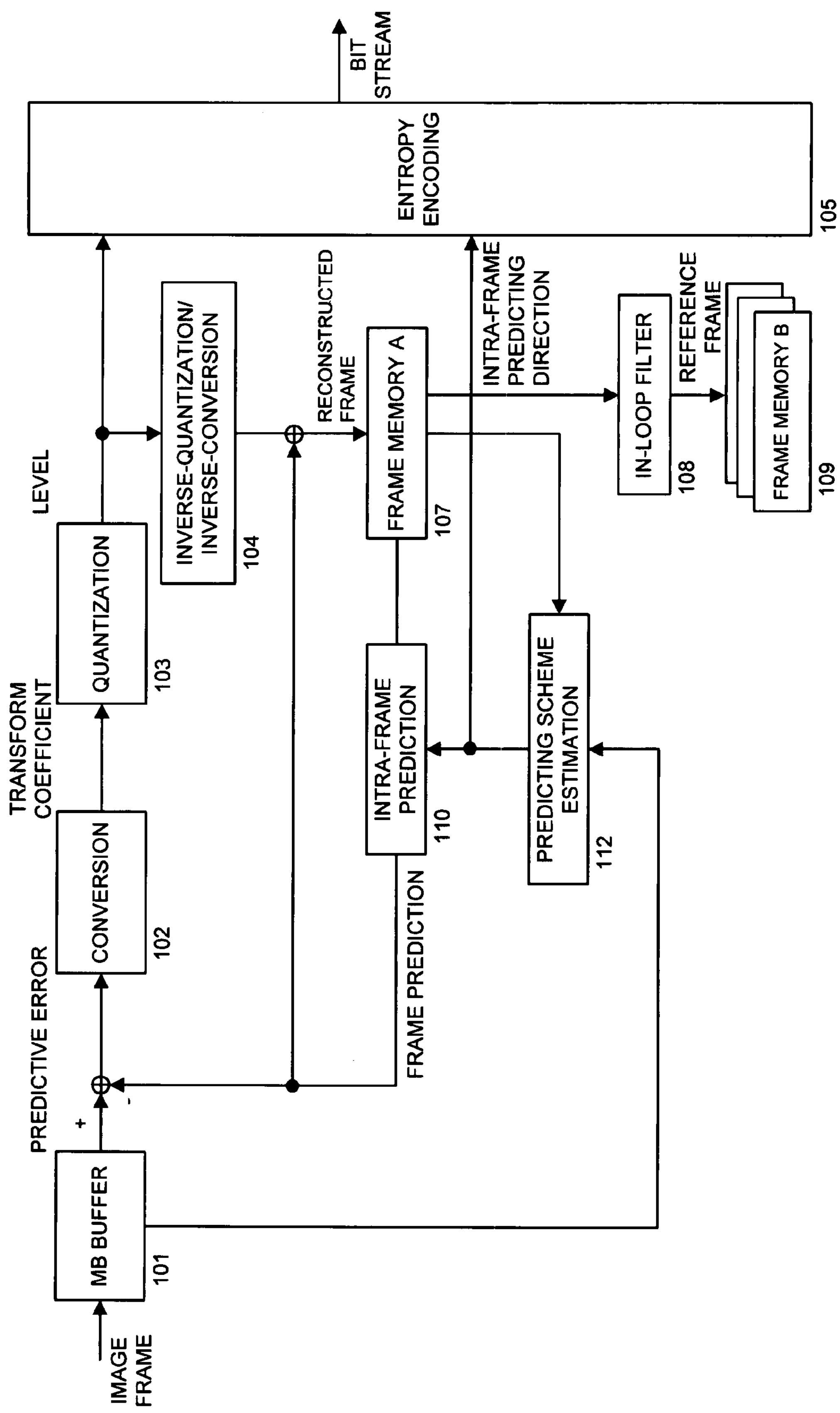
FIG. 26
IMAGE FRAME
MB BUFFER
101
+
-
PREDICTIVE ERROR
CONVERSION
102
TRANSFORM COEFFICIENT
QUANTIZATION
103
LEVEL
INVERSE-QUANTIZATION/ INVERSE-CONVERSION
104
RECONSTRUCTED FRAME
FRAME MEMORY A
107
INTRA-FRAME PREDICTION
110
FRAME PREDICTION
PREDICTING SCHEME ESTIMATION
112
INTRA-FRAME PREDICTING DIRECTION
IN-LOOP FILTER
108
REFERENCE FRAME
FRAME MEMORY B
109
ENTROPY ENCODING
105
BIT STREAM

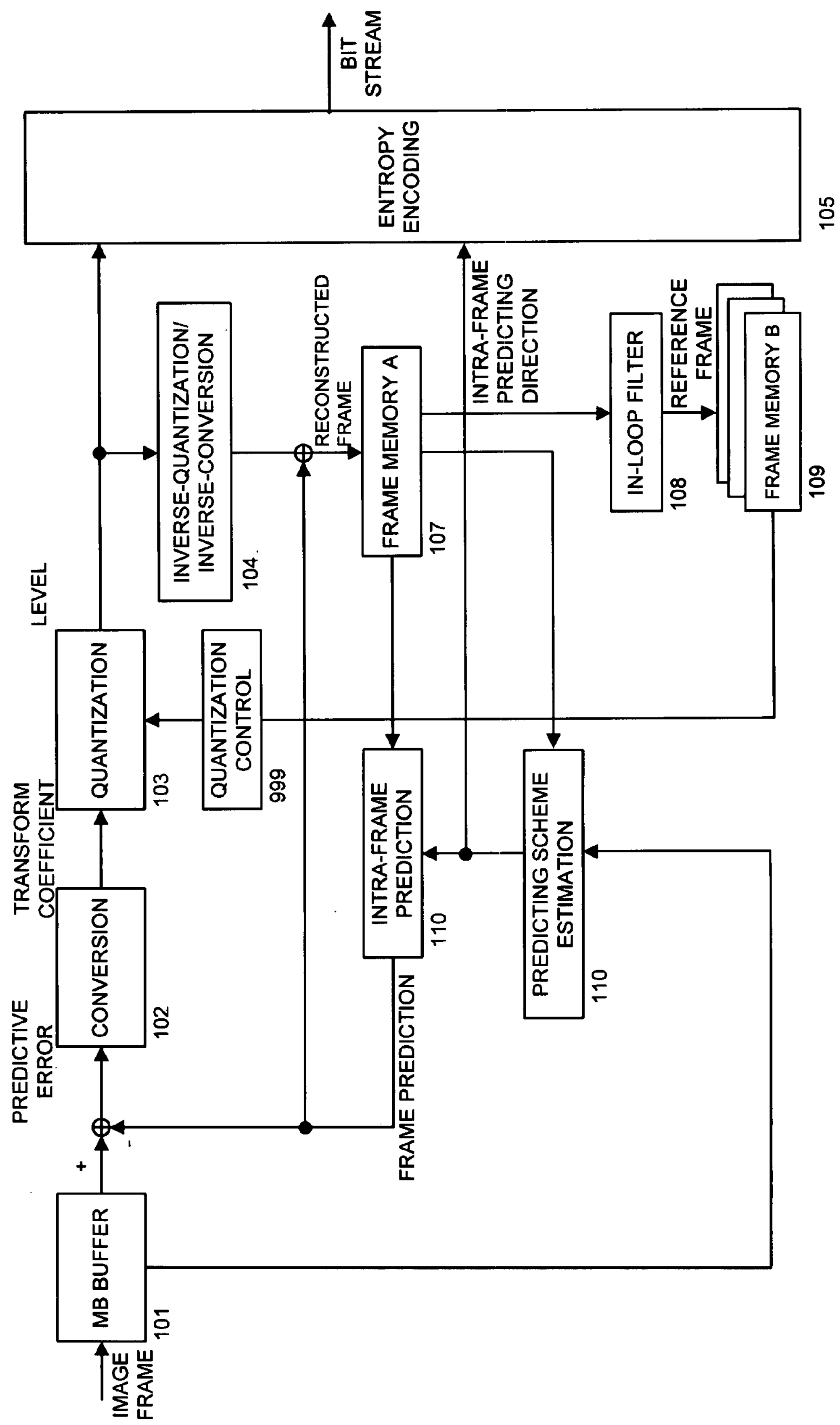
FIG. 27
IMAGE FRAME
MB BUFFER
101
+
-
PREDICTIVE ERROR
CONVERSION
102
TRANSFORM COEFFICIENT
QUANTIZATION
103
LEVEL
QUANTIZATION CONTROL
999
INVERSE-QUANTIZATION/ INVERSE-CONVERSION
104
RECONSTRUCTED FRAME
FRAME MEMORY A
107
FRAME PREDICTION
INTRA-FRAME PREDICTION
110
PREDICTING SCHEME ESTIMATION
110
INTRA-FRAME PREDICTING DIRECTION
IN-LOOP FILTER
108
REFERENCE FRAME
FRAME MEMORY B
109
ENTROPY ENCODING
105
BIT STREAM IMAGE
FRAME MEMORY
D103
RECONSTRUCTED IMAGE FRAME
INTRA-FRAME PREDICTION
D104
INTER-FRAME PREDICTION
D105
PREDICTED VALUE
SW100
PREDICTIVE ERROR
QUANTIZING PARAMETER
INVERSE-QUANTIZATION/ INVERSE-CONVERSION
D102
LEVEL
MB TYPE/ PREDICTING DIRECTION/ MOTION VECTOR
ENTROPY DECODING
D101
BIT STREAM

MOVING PICTURE ENCODING METHOD, DEVICE USING THE SAME, AND COMPUTER PROGRAM

TECHNICAL FIELD

The present invention relates to a moving picture encoding technique, which is suitably applicable to a moving picture encoding apparatus for accumulating moving picture signals, for example.

BACKGROUND ART

Conventional moving picture encoding apparatuses generate a sequence of encoded information, i.e., a bit stream, by digitizing moving picture signals input from the outside and then performing encoding processing in conformity with a certain moving picture encoding scheme.

One of the moving picture encoding schemes is ISO/IEC 14496-10, Advanced Video Coding, which was recently approved as a standard (see Non-patent Document 1, ISO/IEC 14496-10 Advanced Video Coding). Moreover, one known reference model in developing an encoder according to the Advanced Video Coding is a JM (Joint Model) scheme.

In the JM scheme, each of image frames making up a moving picture is divided into blocks each having a size of 16×16 pixels, which block is generally referred to as MB (Macro Block), and each MB is divided into blocks each having a size of 4×4 pixels (which will be referred to as 4×4 block hereinbelow), the 4×4 block being used as a minimum elemental unit for encoding.

FIG. 1 shows an example of the block division for an image frame in QCIF (Quarter Common Intermediate Format). Although an ordinary image frame is composed of brightness signals and color-difference signals, the following description will address only brightness signals for simplifying the explanation.

Now the operation of the JM scheme in which an image frame is input and a bit stream is output will be described hereinbelow with reference to FIG. 1.

Referring to FIG. 2, the JM scheme (conventional) is comprised of an MB buffer 101, a converting apparatus 102, a quantizing apparatus 103, an inverse-quantizing/inverse-converting apparatus 104, an entropy encoding apparatus 105, a bit-rate control apparatus 106, a frame memory A 107, an in-loop filtering apparatus 108, a frame memory B 109, an intra-frame-predicting apparatus 110, an inter-frame predicting apparatus 111, a predicting scheme estimating apparatus 112, and a switch SW100.

The operation of the apparatuses will now be described.

The MB buffer 101 stores pixel values in an MB to be encoded of an input image frame.

From the pixel values (which will be simply referred to as input MB hereinbelow) of the MB to be encoded supplied by the MB buffer 101 are subtracted predicted values supplied by the intra-frame predicting apparatus 110 or inter-frame predicting apparatus 111. The input image from which the predicted values have been subtracted is called a predictive error.

In inter-frame prediction, a current block to be encoded is predicted making reference to an image frame reconstructed in the past whose display time is different from that of the current image frame to be encoded, and using a correlation between the image frames in a temporal direction. In the following description, encoding requiring the inter-frame prediction in decoding will be sometimes called inter-encoding, an inter-encoded MB will be called inter-MB, and a predicted value generated by the inter-frame prediction will be called inter-frame predicted value or inter-frame predicted image.

On the other hand, encoding that does not use the aforementioned inter-frame prediction in decoding will be called intra-encoding, and an intra-encoded MB will be called intra-MB. In the JM scheme, intra-frame prediction may be used in intra-encoding. In the intra-frame prediction, a current block to be encoded is predicted making reference to an image frame reconstructed in the past whose display time is the same as that of the current image frame to be encoded, and using a correlation between the image frame in a spatial direction. A predicted value generated by the intra-frame prediction will be called an intra-frame predicted value or intra-frame predicted image hereinbelow.

An encoded image frame exclusively composed of the aforementioned intra-MB's will be called I-frame. On the other hand, an encoded image frame composed of the inter-MB's, in addition to the aforementioned intra-MB's, will be called P-frame, and an encoded image frame containing inter-MB's that can be predicted in inter-frame prediction not only from one image frame but from two simultaneous frames will be called B frame.

In general, when a scene is still, a pixel correlation between adjacent image frames is very high, so more effective compression can be made in inter-encoding than in intra-encoding. Thus, most image frames in a moving picture are encoded with a P- or B-frame in which inter-encoding can be used.

The converting apparatus 102 frequency-converts the aforementioned predictive error from a spatial domain into a frequency domain on a block-by-block basis, wherein the block is smaller than an MB. The predictive error converted into the frequency domain is generally called transform coefficient. The frequency conversion that may be used is orthogonal transform such as DCT (Discrete Cosine Transform) or Hadamard transform, and the JM scheme (conventional) employs integer-precision DCT in which the basis is expressed in an integer, with a block size of 4×4 pixels.

On the other hand, the bit-rate control apparatus 106 monitors the number of bits of a bit stream output by the entropy encoding apparatus 105 for the purpose of encoding the input image frame in a target number of bits; if the number of bits of the output bit stream is greater than the target number of bits, the apparatus 106 outputs a quantizing parameter indicating a larger quantization step size; on the contrary, if the number of bits of the output bit stream is smaller than the target number of bits, it outputs a quantizing parameter indicating a smaller quantization step size. The output bit stream is thus encoded to have a number of bits closer to the target number of bits.

The quantizing apparatus 103 quantizes the aforementioned transform coefficients with a quantization step size corresponding to the quantizing parameter supplied by the bit-rate control apparatus 106. The quantized transform coefficient is sometimes referred to as level or quantized value (a quantized value to be intra-encoded will be referred to as quantized value in intra-encoding, and that to be inter-encoded will be referred to as quantized value in inter-encoding hereinbelow). The quantized values are entropy-encoded by the entropy encoding apparatus 105 and output as a sequence of bits, i.e., a bit stream.

An apparatus consisting of the converting apparatus 102 and quantizing apparatus 103 together will be sometimes called a converting/quantizing apparatus 200 hereinbelow.

Subsequently, the inverse-quantizing/inverse-converting apparatus 104 applies inverse quantization to the levels supplied by the quantizing apparatus 103 for subsequent encoding, and further applies thereto inverse frequency-convert to bring them back into the original spatial domain.

The inversely quantized transform coefficient will be called inversely quantized transform coefficient or reconstructed transform coefficient hereinbelow. The predictive error brought back into the original spatial domain will be called reconstructed predictive error hereinbelow.

The frame memory A 107 stores values representing the reconstructed predictive errors added with the predicted values as a reconstructed frame.

After all MB's in a current image frame to be encoded have been encoded, the in-loop filtering 108 applies noise-reducing filtering to the reconstructed frame stored in the frame memory A 107.

The frame memory B 109 stores the image frame after the noise-reducing filtering supplied by the in-loop filter 108 as a reference frame.

The intra-frame predicting apparatus 110 generates intra-frame predicted values from the reconstructed frame stored in the frame memory A 107 based on an MB type and an intra-frame predicting direction supplied by the predicting scheme estimating apparatus 112.

The inter-frame predicting apparatus 111 generates inter-frame predicted values from the reference frame stored in the frame memory B 109 based on an MB type and a motion vector supplied by the predicting scheme estimating apparatus 112.

The predicting scheme estimating apparatus 112 estimates a set of an intra-frame predicting direction and an intra-MB type and a set of a motion vector and an inter-MB type in inter-frame prediction that give a minimum predictive error with respect to the input MB.

The switch SW100 selects as a predicted value an output from the intra-frame predicting apparatus 110 if intra-frame prediction minimizes a predictive error, or otherwise, it selects an output from the inter-frame predicting apparatus 111 based on a result of prediction at the predicting scheme estimating apparatus 112.

The JM scheme thus encodes a moving picture by executing such processing.

When encoding a moving picture for the purpose of broadcasting or storage, the moving picture encoding using the inter-encoding cyclically inserts an I-frame to allow partial replay (decoding) starting from some midpoint. A simple example for this is shown in FIG. 3.

However, as a side effect of the cyclic I-frame insertion, visually conspicuous flickering in a cycle of I-frame insertion (referred to as I-frame flickering hereinbelow) occurs. As the bit rate in encoding a moving picture is lowered, the I-frame flickering deteriorates subjective image quality.

The reason why the I-frame flickering is visually conspicuous is that the noise pattern in intra-encoding of an I-frame is different from that in inter-encoding of a P-frame displayed immediately before. This difference in the noise pattern in encoding is caused by a difference in prediction structure between the I- and P-frames (FIG. 4).

A means for reducing such flickering that can be contemplated is adaptive quantization in which the quantization step size is fined in a region with a high the human visual characteristic, as disclosed in Patent Document 1.

Another means for reducing such flickering that can be contemplated is a method involving using a near-optimal ratio of the quantization step sizes for I-, P- and B-frames to keep constant image quality, as disclosed in Patent Document 2.

Still another means for reducing such flickering that can be contemplated is a method of reducing flickering between consecutive P-frames by using a level of the predictive error of zero whenever the residual signal of a P-frame is smaller than the quantization dead-zone width, as disclosed in Patent Document 3.

Still another means for reducing such flickering that can be contemplated is a method involving encoding all consecutive frames as I-frame and keeping a uniform level in a region decided to be still, as disclosed in Non-patent Document 2.

Still another means for reducing such flickering that can be contemplated is a method involving encoding all consecutive frames as I-frame and substituting the level in a region decided to be still with that of a previously encoded image frame, as disclosed in Patent Document 4.

Still another means for reducing such flickering that can be contemplated is a method involving, in a region decided to be still in encoding an I-frame, estimating an intra-frame predicting direction taking account of similarity to an I-frame encoded immediately before to prevent fluctuation in the intra-frame predicted value, as disclosed in Non-patent Document 3.

Patent Document 1: Japanese Patent Application Laid Open No. 2002-335527

Patent Document 2: Japanese Patent Application Laid Open No. 1993-111012

Patent Document 3: Japanese Patent Application Laid Open No. 1996-251593

Patent Document 4: Japanese Patent Application Laid Open No. 2003-235042

Non-patent Document 1: ISO/IEC 14496-10 Advanced Video Coding

Non-patent Document 2: Iguchi, et al., "A Method of Reducing Intra-mode Flickering in H.264 Encoding," FIT 2003, J-040, 2003

Non-patent Document 3: Sakaida, et al, "Intra-frame Flicker Suppression in AVC/H.264 Encoding Using Adaptive Quantization" FIT 2004, LJ-009, 2004

DISCLOSURE OF THE INVENTION

Problems to be Solved by the Invention

The technique in Patent Document 1, however, cannot provide a desired effect because, if an entire image frame has a high visual characteristic or a target rate is extremely low, the quantization step size in a region with a high visual characteristic cannot be preferentially fined.

The technique in Patent Document 2 cannot principally solve the problem because the aforementioned I-frame flickering depends more on the difference in noise pattern between intra-encoding and inter-encoding as described above than on the ratio of the quantization step sizes among different frame types.

The technique in Patent Document 3 cannot solve the problem because of the fact that since the technique is merely applicable between P-frames having the same encoding structure, and it cannot be applied to suppression of I-frame flickering generated due to the difference in noise pattern between intra-encoding and inter-encoding as described above.

The technique in Non-patent Document 2 cannot solve the problem for the following reasons: "all image frames are encoded as I-frame, thus resulting in poor image quality at a low rate;" "since intra-frame prediction is performed not in a pixel space but after quantization in a converted domain, quantization noise in intra-encoding is superposed over a predictive error signal, thus resulting in poor image quality at a low rate;" "the technique cannot be applied when it is combined with inter-encoding such as that in a P- or B-frame;" and "it cannot be applied when a picture is in motion."

The technique in Patent Document 4 has the following problems, as in Non-patent Document 2: "all image frames are encoded as I-frame, thus resulting in poor encoding efficiency;" "the technique cannot be applied when it is combined with inter-frame prediction encoding such as that in a P- or B-frame;" and "it cannot be applied when a picture is in motion."

The technique in Non-patent Document 3 has the following problems: "if the technique is combined with inter-frame prediction such as that in a P- or B-frame, it provides an insufficient effect for a picture in motion because the inter-frame distance between an I-frame encoded immediately before and a current I-frame to be encoded is large;" and "the coordinates of an object in a picture are not constant between image frames except in the completely still scene, and as a result, fluctuation in intra-frame predicted value cannot be suppressed and a sufficient effect cannot be obtained."

The present invention has been therefore made in view of such problems, and its object is to provide a moving picture encoding method, and an apparatus or a computer program using the same, capable of achieving effective reduction of the I-frame flickering as described above when a moving picture is encoded using not only I-frames but also using inter-frame prediction such as that in P- and B-frames, and even when a moving picture containing scenes in motion is encoded.

Means For Solving The Problems

The 1st invention for solving the above-mentioned problem is a moving picture encoding apparatus characterized in comprising: means for intra-encoding an image using an image frame that is encoded using inter-encoding and then reconstructed.

The 2nd invention for solving the above-mentioned problem, in the above-mentioned 1st invention, is characterized in that an image frame that is encoded using said inter-encoding and then reconstructed is a past image frame relative to said image to be intra-encoded.

The 3rd invention for solving the above-mentioned problem, in the above-mentioned 2nd invention, is characterized in that said past image frame is a P-frame immediately before said image to be intra-encoded.

The 4th invention for solving the above-mentioned problem, in the above-mentioned 3rd invention, is characterized in comprising means for correcting a quantized value in intra-encoding using a reconstructed image obtained by applying inter-frame prediction, conversion, quantization, inverse-quantization, and inverse-conversion to an image to be intra-encoded with an image in said P-frame.

The 5th invention for solving the above-mentioned problem, in the above-mentioned 3rd invention, is characterized in comprising means for correcting a quantized value in intra-encoding using an inter-frame predicted image obtained by applying inter-frame prediction to an image to be intra-encoded with an image in said P-frame.

The 6th invention for solving the above-mentioned problem, in the above-mentioned 4th or 5th inventions, is characterized in that a quantized value obtained by converting a difference between said image for use in correction and an intra-frame predicted value image and applying quantization thereto is used as a quantized value in intra-encoding.

The 7th invention for solving the above-mentioned problem, in the above-mentioned 4th or 5th inventions, is characterized in that a quantized value obtained by converting said image for use in correction and applying quantization thereto is used as a quantized value in intra-encoding.

The 8th invention for solving the above-mentioned problem, in the above-mentioned 6th or 7th inventions, is characterized in that said quantization has a rounding-off quantizing property.

The 9th invention for solving the above-mentioned problem, in the above-mentioned 8th invention, is characterized in that correction on said quantized value in intra-encoding is applied only when a difference between a transform coefficient in intra-encoding and that obtained from said image for use in correction is equal to or smaller than a quantization dead-zone width in inter-encoding.

The 10th invention for solving the above-mentioned problem, in the above-mentioned 3rd invention, is characterized in comprising means for intra-encoding a reconstructed image produced by applying inter-frame prediction, conversion, quantization, inverse-quantization, and inverse-conversion to an image to be intra-encoded with an image in said P-frame.

The 11th invention for solving the above-mentioned problem, in the above-mentioned 3rd invention, is characterized in comprising means for intra-encoding an inter-frame predicted image produced by applying inter-frame prediction to an image to be intra-encoded with an image in said P-frame.

The 12th invention for solving the above-mentioned problem, in the above-mentioned 10th or 11th inventions, is characterized in that said intra-encoding is applied when a difference between said produced image and an image to be intra-encoded is equal to or smaller than a quantization dead-zone width in inter-encoding in a pixel space.

The 13th invention for solving the above-mentioned problem is a moving picture encoding method characterized in comprising: intra-encoding an image using an image frame that is encoded using inter-encoding and then reconstructed.

The 14th invention for solving the above-mentioned problem, in the above-mentioned 13th invention, is characterized in that an image frame that is encoded using said inter-encoding and then reconstructed is a past image frame relative to said image to be intra-encoded.

The 15th invention for solving the above-mentioned problem, in the above-mentioned 14th invention, is characterized in that said past image frame is a P-frame immediately before said image to be intra-encoded.

The 16th invention for solving the above-mentioned problem, in the above-mentioned 15th invention, is characterized in comprising correcting a quantized value in intra-encoding using a reconstructed image obtained by applying inter-frame prediction, conversion, quantization, inverse-quantization, and inverse-conversion to an image to be intra-encoded with an image in a P-frame.

The 17th invention for solving the above-mentioned problem, in the above-mentioned 15th invention, is characterized in comprising correcting a quantized value in intra-encoding using an inter-frame predicted image obtained by applying inter-frame prediction to an image to be intra-encoded with an image in said P-frame.

The 18th invention for solving the above-mentioned problem, in the above-mentioned 16th or 17th inventions, is characterized in that a quantized value obtained by converting a difference between said image for use in correction and an intra-frame predicted value image and applying quantization thereto is used as a quantized value in intra-encoding.

The 19th invention for solving the above-mentioned problem, in the above-mentioned 16th or 17th inventions, is characterized in that: a quantized value obtained by converting said image for use in correction and applying quantization thereto is used as a quantized value in intra-encoding.

The 20th invention for solving the above-mentioned problem, in the above-mentioned 18th or 19th inventions, is characterized in that said quantization has a rounding-off quantizing property.

The 21st invention for solving the above-mentioned problem, in the above-mentioned 20th invention, is characterized in that correction on said quantized value in intra-encoding is applied only when a difference between a transform coefficient in intra-encoding and that obtained from said image for use in correction is equal to or smaller than a quantization dead-zone width in inter-encoding.

The 22nd invention for solving the above-mentioned problem, in the above-mentioned 15th invention, is characterized in comprising intra-encoding a reconstructed image produced by applying inter-frame prediction, conversion, quantization, inverse-quantization, and inverse-conversion to an image to be intra-encoded with an image in said P-frame.

The 23rd invention for solving the above-mentioned problem, in the above-mentioned 15th invention, is characterized in comprising intra-encoding an inter-frame predicted image produced by applying inter-frame prediction to an image to be intra-encoded with an image in said P-frame.

The 24th invention for solving the above-mentioned problem, in the above-mentioned 22nd or 23rd inventions, is characterized in that said intra-encoding is applied when a difference between said produced image and an image to be intra-encoded is equal to or smaller than a quantization dead-zone width in inter-encoding in a pixel space.

The 25th invention for solving the above-mentioned problem is a program for causing an information processing apparatus to perform moving picture encoding, characterized in that said program causes said information processing apparatus to act as: means for intra-encoding an image using an image frame that is encoded using inter-encoding and then reconstructed.

The 26th invention for solving the above-mentioned problem, in the above-mentioned 25th invention, is characterized in that an image frame that is encoded using said inter-encoding and then reconstructed is a past image frame relative to said image to be intra-encoded.

The 27th invention for solving the above-mentioned problem, in the above-mentioned 26th invention, is characterized in that said past image frame is a P-frame immediately before said image to be intra-encoded.

The 28th invention for solving the above-mentioned problem, in the above-mentioned 27th invention, is characterized in that said program causes said information processing apparatus to act as: means for correcting a quantized value in intra-encoding using a reconstructed image obtained by applying inter-frame prediction, conversion, quantization, inverse-quantization, and inverse-conversion to an image to be intra-encoded with an image in a P-frame.

The 29th invention for solving the above-mentioned problem, in the above-mentioned 27th invention, is characterized in that said program causes said information processing apparatus to act as: means for correcting a quantized value in intra-encoding using an inter-frame predicted image obtained by applying inter-frame prediction to an image to be intra-encoded with an image in said P-frame.

The 30th invention for solving the above-mentioned problem, in the above-mentioned 28th or 29th inventions, is characterized in that a quantized value obtained by converting a difference between said image for use in correction and an intra-frame predicted value image and applying quantization thereto is used as the quantized value in intra-encoding.

The 31st invention for solving the above-mentioned problem, in the above-mentioned 28th or 29th inventions, is characterized in that a quantized value obtained by converting said image for use in correction and applying quantization thereto is used as a quantized value in intra-encoding.

The 32nd invention for solving the above-mentioned problem, in the above-mentioned 30th or 31st inventions, is characterized in that said quantization has a rounding-off quantizing property.

The 33rd invention for solving the above-mentioned problem, in the above-mentioned 32nd invention, is characterized in that correction on said quantized value in intra-encoding is applied only when a difference between a transform coefficient in intra-encoding and that obtained from said image for use in correction is equal to or smaller than a quantization dead-zone width in inter-encoding.

The 34th invention for solving the above-mentioned problem, in the above-mentioned 27th invention, is characterized in that said program causes said information processing apparatus to act as: means for intra-encoding a reconstructed image produced by applying inter-frame prediction, conversion, quantization, inverse-quantization, and inverse-conversion to an image to be intra-encoded with an image in said P-frame.

The 35th invention for solving the above-mentioned problem, in the above-mentioned 27th invention, is characterized in that said program causes said information processing apparatus to act as: means for intra-encoding an inter-frame predicted image produced by applying inter-frame prediction to an image to be intra-encoded with an image in said P-frame.

The 36th invention for solving the above-mentioned problem, in the above-mentioned 34th or 35th inventions, is characterized in that: said intra-encoding is applied when a difference between said produced image and an image to be intra-encoded is equal to or smaller than a quantization dead-zone width in inter-encoding in a pixel space.

The 37th invention for solving the above-mentioned problem is a moving picture encoding apparatus characterized in comprising: means for causing noise resulting from intra-encoding to resemble noise resulting from inter-encoding.

The 38th invention for solving the above-mentioned problem is a moving picture encoding method characterized in comprising: causing noise resulting from intra-encoding to resemble noise resulting from inter-encoding.

The 39th invention for solving the above-mentioned problem is a system for encoding/decoding a moving picture characterized in having: means for, when intra-encoding an image, encoding it using an image frame that is encoded using inter-encoding and then reconstructed; and decoding means for decoding said encoded data.

The 40th invention for solving the above-mentioned problem is a method of encoding/decoding a moving picture characterized in having steps of: when intra-encoding an image, encoding it using an image frame that is encoded using inter-encoding and then reconstructed; and decoding said encoded data.

The intra-encoding according to the present invention comprises, in addition to the conventional intra-encoding, a quantization control apparatus 999 that is supplied as an input with a reference frame stored in the frame memory 109 for correcting the level (quantized value) in intra-encoding output by the quantizing apparatus 103, as shown in FIG. 27.

The quantization control apparatus 999 has a function of, if a reference frame displayed on a replay side immediately before a current image frame to be encoded is an inter-encoded image frame, properly correcting the level (quantized value) in intra-encoding to visually reduce I-frame flickering due to a difference between a property of inter-encoding noise in an inter-encoded image frame and a property of noise in current intra-encoding.

This can reduce I-frame flickering when a moving picture is encoded using not only I-frames but also using inter-frame prediction such as that in P- and B-frames, and even when a moving picture containing scenes in motion is encoded.

Effects of the Invention

The present invention can provide a moving picture encoding method, and an apparatus or a computer program using the same, capable of achieving effective reduction of I-frame flickering when a moving picture is encoded using not only I-frames but also using inter-frame prediction such as that in P- and B-frames, and even when a moving picture containing scenes in motion is encoded.

BRIEF DESCRIPTION OF THE DRAWINGS

FIG. 2 is a block diagram of a conventional moving picture encoding apparatus.

FIG. 3 is a diagram for explaining cyclic insertion of an I-frame for partial replay starting from some midpoint.

FIG. 11 is a block diagram of a moving picture encoding apparatus of the present invention.

FIG. 15 is a block diagram of a converting/quantizing apparatus in Embodiment 1.

FIG. 20 is a block diagram of a converting/quantizing apparatus in Embodiment 3.

FIG. 26 is a diagram for explaining the present invention.

FIG. 27 is a diagram for explaining the present invention.

EXPLANATION OF SYMBOLS

Figure 1:
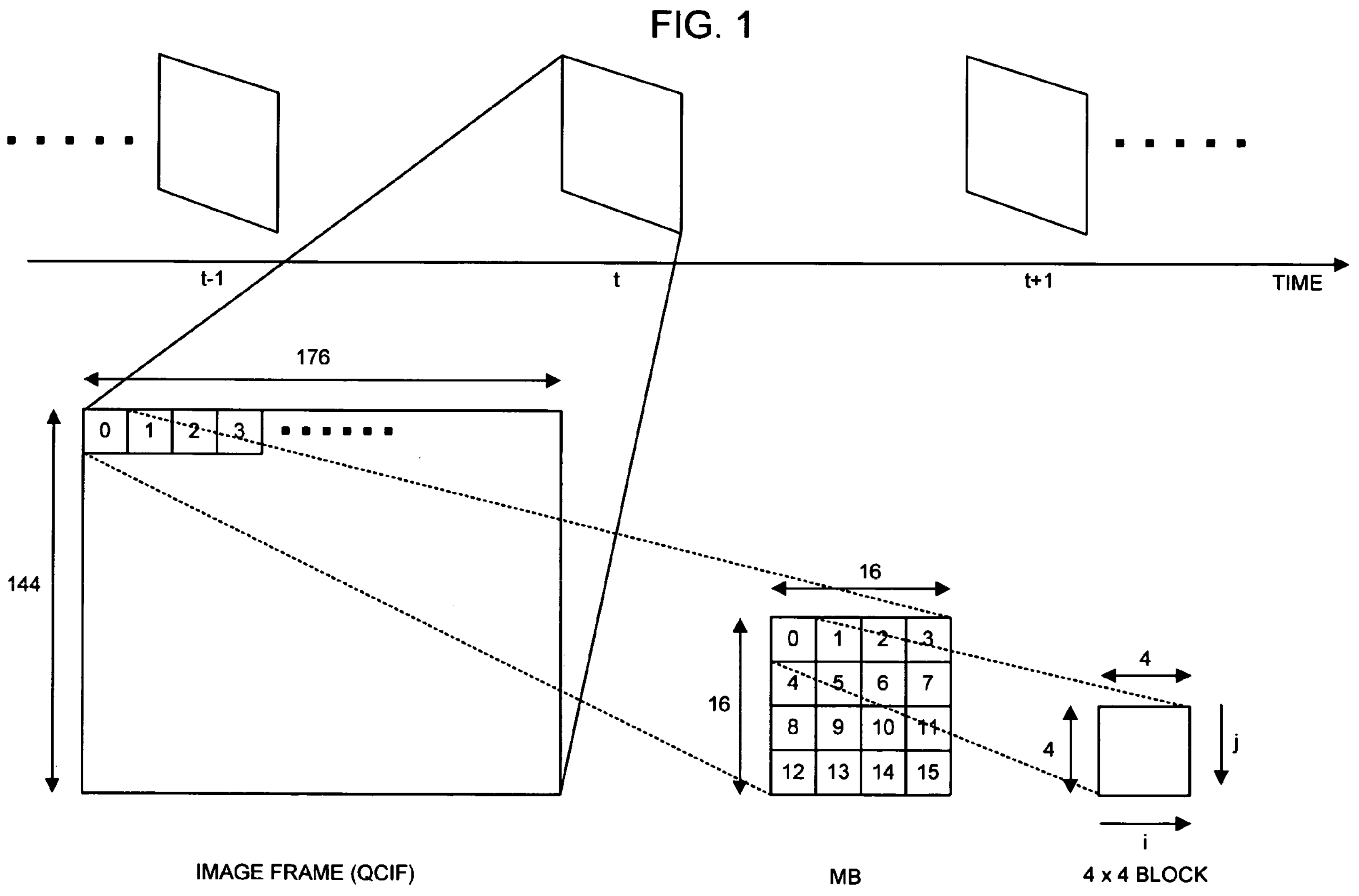
FIG. 1 is a diagram showing the configuration of an image frame.
Figure 4:
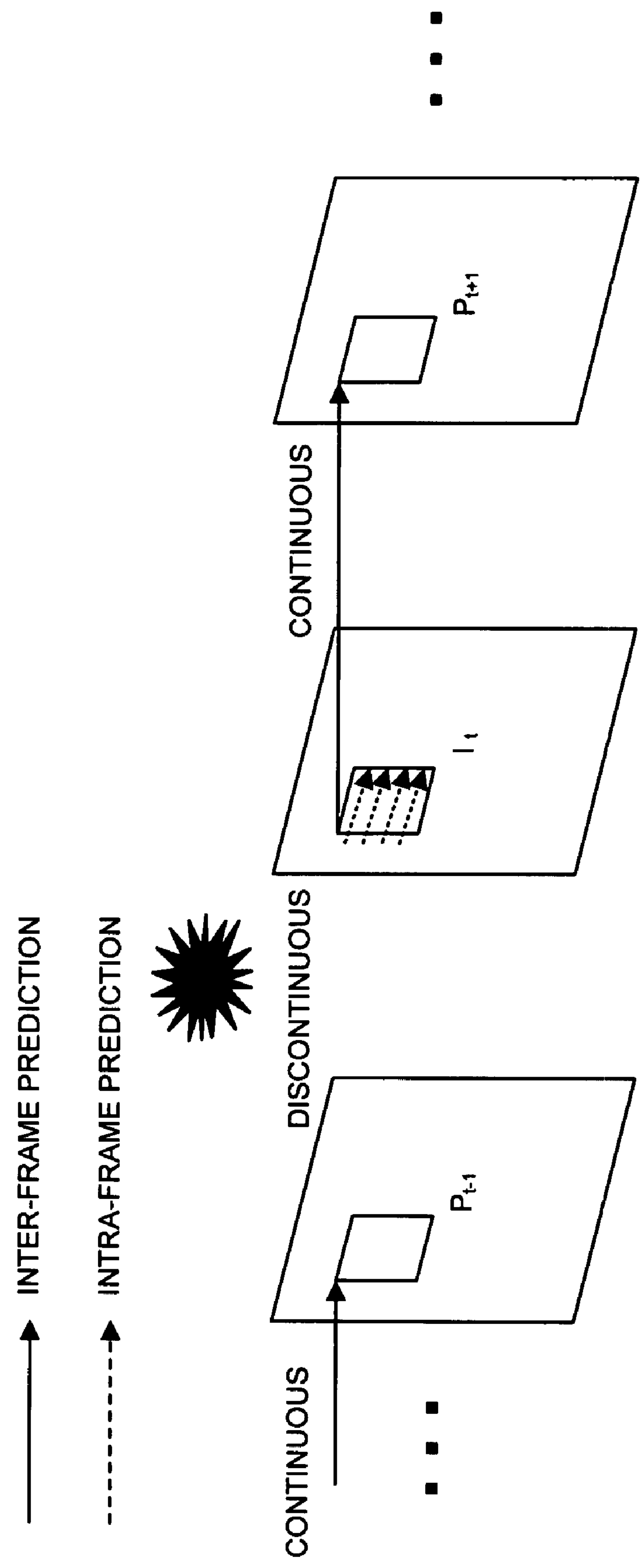
FIG. 4 is a diagram for explaining generation of I-frame flickering.

102 Converting apparatus
103 Quantizing apparatus
104 Inverse-quantizing/inverse-converting apparatus
200 Converting/quantizing apparatus
300 I-frame flickering suppression control apparatus
301 Controller

BEST MODES FOR CARRYING OUT THE INVENTION

Several modes for carrying out the present invention will now be described.

First, for facilitating understanding of the present invention, an outline of the present invention will be described hereinbelow.

FIG. 26 shows the conventional moving picture encoding apparatus shown in FIG. 2 only in a block that works in intra-encoding. As can be seen from FIG. 26, the conventional scheme simply intra-encodes an input image without taking account of noise in encoding a reference frame, i.e., an image frame at a display time different from that for a current image to be encoded.

If an inter-encoded image frame is thus contained in the reference frames, simple intra-encoding of the input results in the aforementioned I-frame flickering.

Next, FIG. 27 shows a moving picture encoding apparatus of the present invention in a block that works in intra-encoding. The intra-encoding of the invention in FIG. 27 comprises, in addition to the conventional intra-encoding in FIG. 26, a quantization control apparatus 999 that is supplied as an input with a reference frame stored in the frame memory 109 for correcting the level (quantized value) in intra-encoding output by the quantizing apparatus 103.

The quantization control apparatus 999 has a function of, if a reference frame displayed on a replay side immediately before a current image frame to be encoded is an inter-encoded image frame, properly correcting the level (quantized value) in intra-encoding to visually reduce I-frame flickering due to a difference between a property of inter-encoding noise in an inter-encoded image frame and a property of noise in current intra-encoding.

This can achieve effective reduction of I-frame flickering when a moving picture is encoded using not only I-frames but also using inter-frame prediction such as that in P- and B-frames, and even when a moving picture containing scenes in motion is encoded.

Now details of the present invention will be described.

Embodiment 1

To clarify differences between the inventive scheme and conventional scheme (JM scheme), conversion and quantization in the JM scheme will first be described in more detail.

<Conversion and Quantization in JM Scheme>

Figure 5:
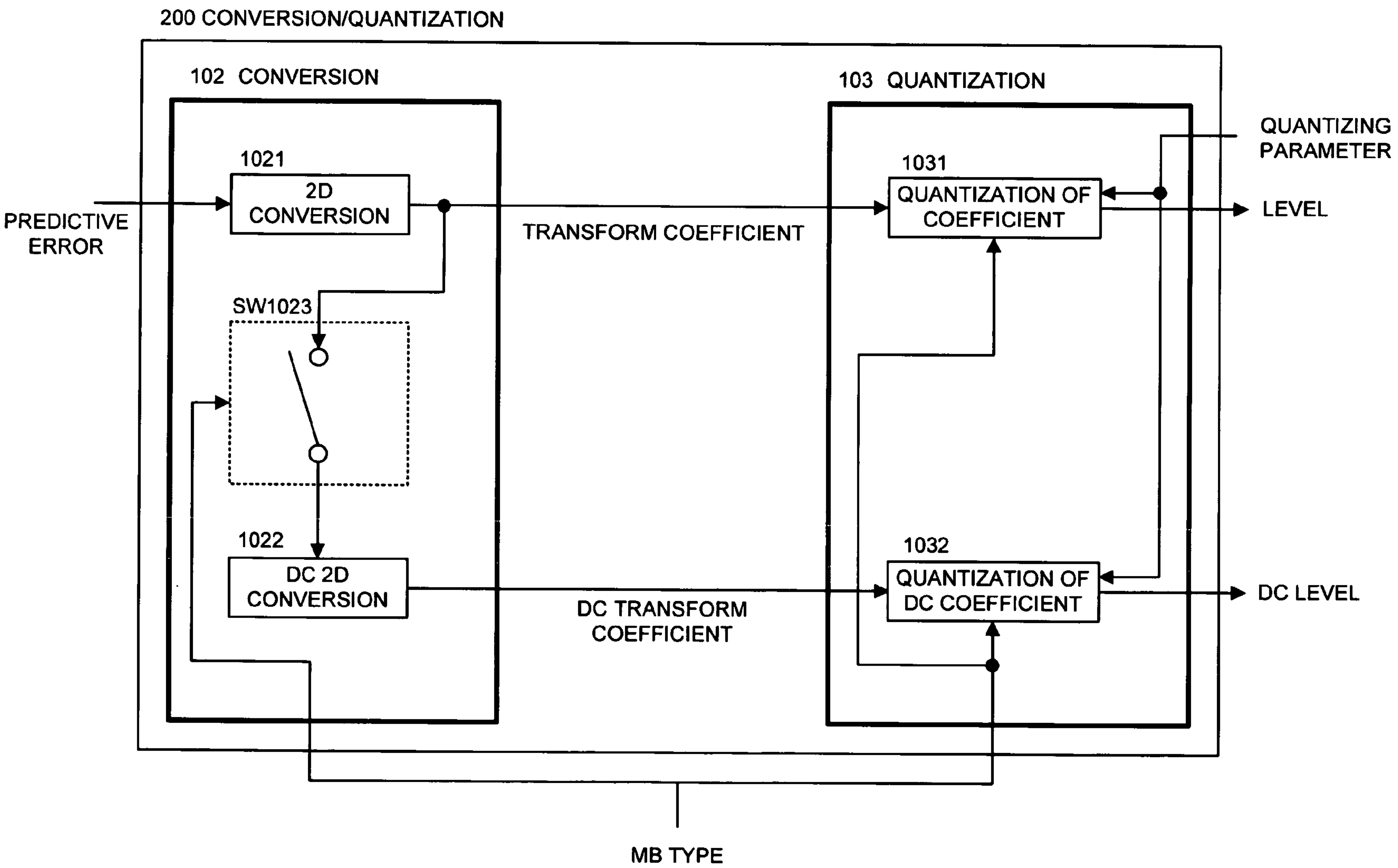
FIG. 5 is a block diagram of a conventional converting/quantizing apparatus.

The configuration of the converting/quantizing apparatus 200 in FIG. 2 is shown in FIG. 5 in more detail.

The converting apparatus 102 is comprised of a 2D converting apparatus 1021, a DC 2D converting apparatus 1022, and a switch SW1023. The 2D converting apparatus 1021 performs 2D conversion, which will be described later, on a predictive error. If a supplied MB type is Intra16MB, which will be described later, the switch SW1023 supplies a DC transform coefficient among transform coefficients supplied by the 2D converting apparatus 1021, to the DC 2D converting apparatus 1022. The DC 2D converting apparatus 1022 performs DC 2D conversion, which will be described later, on the supplied DC transform coefficient.

The quantizing apparatus 103 is comprised of a coefficient quantizing apparatus 1031 and a DC coefficient quantizing apparatus 1032. The coefficient quantizing apparatus 1031 quantizes a transform coefficient by coefficient quantization, which will be described below, based on the input quantizing parameter and MB type, and outputs a level. The DC coefficient quantizing apparatus 1032 quantizes a DC transform coefficient by DC coefficient quantization, which will be described later, based on the input quantization parameter and MB type, and outputs a DC level.

Next, the operation of the conventional converting/quantizing apparatus will be described in a sequence of generation of a predicted value, generation of a predictive error, 2D conversion on a predictive error, and quantization of a transform coefficient.

First, generation of a predicted value will be described. A predicted value is generated by intra-frame prediction or inter-frame prediction.

Now the intra-frame prediction and inter-frame prediction will be described hereinbelow.

Intra-frame prediction in the JM scheme includes that for an MB type in which intra-frame prediction is made from adjacent pixels for each MB to be encoded (which will be referred to as Intra16MB hereinbelow), and that for another MB type in which intra-frame prediction is made from adjacent pixels for each four-by-four block in an MB to be encoded (which will be referred to as Intra4MB hereinbelow).

Figure 6:
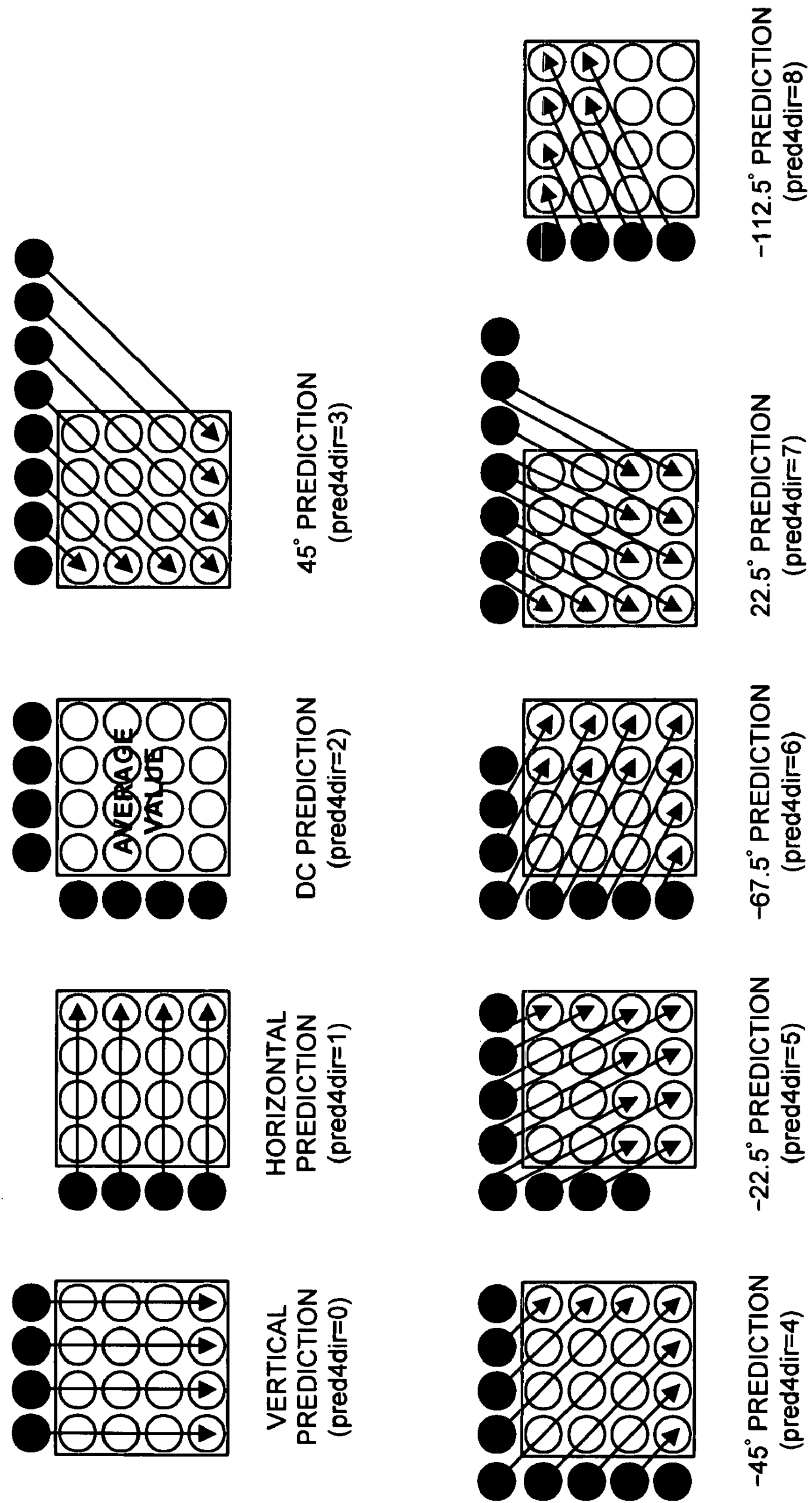
FIG. 6 is a diagram for explaining Intra4MB intra-frame predicting direction.
Figure 7:
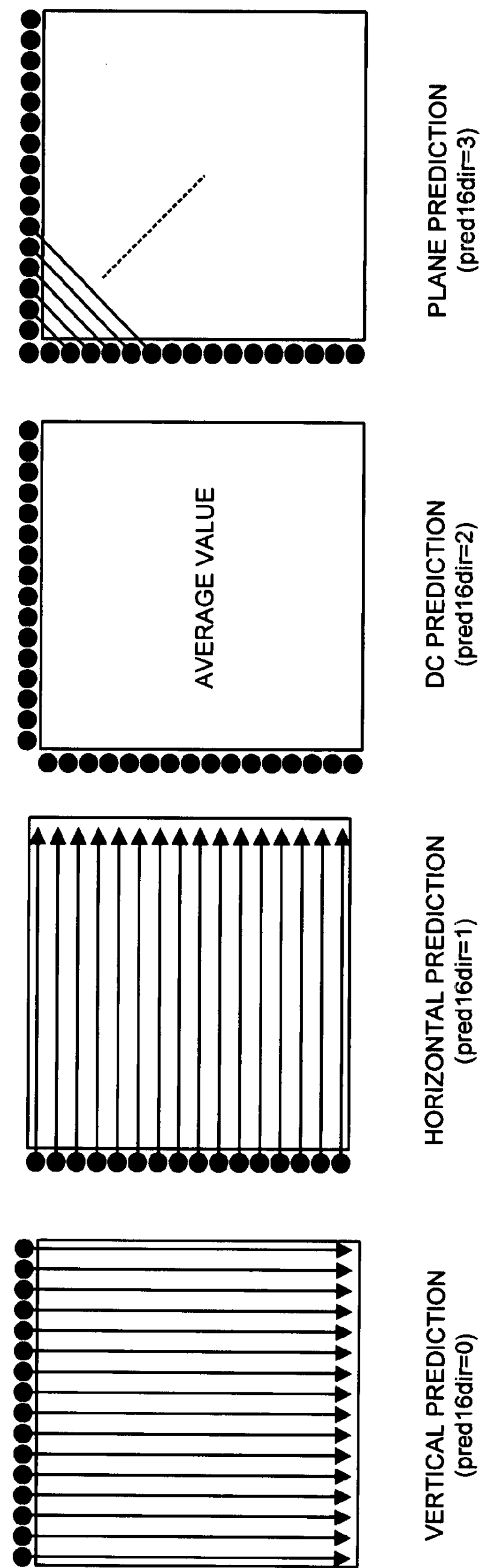
FIG. 7 is a diagram for explaining Intra16 MB intra-frame predicting direction.

Intra4MB is capable of intra-frame prediction using nine intra-frame predicting directions shown in FIG. 6 for each four-by-four block. Intral6MB is capable of intra-frame prediction using four intra-frame predicting directions shown in FIG. 7.

As an example, a formula for generating an intra-frame predicted value $pIntra_{idx}(x, y)$ corresponding to a vertical direction shown in FIG. 6 is given by EQ. (1):

$$pIntra_{idx}(x,y)=rec(t,mbx+b4x_{idx}+x,mby+b4y_{idx}-1) \quad (1),$$

where a resolution of an image frame is represented as 'width' pixels in a horizontal direction and 'height' pixels in a vertical direction, a time of a current frame to be encoded is represented as 't,' a pixel value in a reconstructed frame (which will be stored in the frame memory A 107 in FIG. 2) is represented by rec(t, i, j) {0≦i≦width-1, 0≦j≦height-1}, coordinates at the upper-left corner of the MB to be encoded in the image frame is represented by (MBx, MBy) {0≦MBx≦width-16, 0≦MBy≦height−16}, an index of a 4×4 block to be encoded in the MB is represented as 'idx' {0≦idx≦15} (Refer to a center diagram of FIG. 1), and coordinates at the upper-left corner of the 4×4 block of the index 'idx' within an MB is represented by:

$$(b4x_{idx},b4y_{idx})\{0\leqq b4x_{idx}\leqq 12,0\leqq b4y_{idx}\leqq 12\}.$$

See Non-Patent Document 1 for formulae for generating intra-frame predicted values for Intra4MB or Intra16MB in other predicting directions.

The inter-frame predicted value $pInter_{idx}(x, y)$ can be calculated according to EQ. (2) below, where the inter-frame distance between a reference frame and a current frame to be encoded is represented as 'f,' and a motion vector of a 4×4 block of the index 'idx' is represented as $(mvx_{idx}, mvy_{idx})$:

$$pInter_{idx}(x,y)=MC[rec(t-f),mbx+b4x_{idx}+x,mby+b4y_{idx}+y,mvx_{idx},mvy_{idx}] \quad (2),$$

where MC [rec(t−f), xx, yy, mvx, mvy] is a function for reading a pixel value in a reference frame ref(t−f) corresponding to coordinates (xx, yy) {0≦xx≦width-1, 0≦yy≦height−1} in the image frame to be encoded after being shifted by a motion vector (mvx, mvy) pixels. Moreover, if the motion vector (mvx, mvy) is in fractional precision, MC [rec(t−f), xx, yy, mvx, mvy] above has its pixel value at a fractional position appropriately interpolated using pixels at nearby integer positions.

The reference frame ref(t) is made up with pixels after applying noise-removing filtering to a reconstructed frame rec(t) by the in-loop filter 108 according to EQ. (3). It will be easily recognized that ref(t) is completely identical to rec(t) if noise-removing filtering is turned off.

$$ref(t)=LP[rec(t)] \quad (3),$$

where LP[ ] is a symbol representing noise-removing filtering.

Next, generation of a predictive error will be described.

A predictive error is generated by subtracting the aforementioned predicted value from an input pixel. Representing an input image frame as org(t, i, j) {0≦i≦width-1, 0≦j≦height−1}, and an MB to be encoded as src(i, j) {0≦i≦15, 0≦j≦15}, a predictive error $pe_{idx}(x, y)$ {0≦idx≦15, 0≦x≦3, 0≦y≦3} can be calculated according to EQ. (4) below:

$$pe_{idx}(x,y) = src(b4x_{idx}+x, b4y_{idx}+y) - pred_{idx}(x,y) \quad (4)$$

$$src(i,j) = org(t, mbx+i, mby+j) \quad (5)$$

$$pred_{idx}(i,j) = \begin{cases} pIntra_{idx}(i,j) \ \ldots \ \text{Intra-frame prediction} \\ pInter_{idx}(i,j) \ \ldots \ \text{Inter-frame prediction} \end{cases} \quad (6)$$

Next, 2D conversion on a predictive error will be described.

2D conversion varies according to the MB type of an MB to be encoded. If the MB type is not Intra16MB, 2D conversion according to EQ. (7) is performed; otherwise, if the MB type is Intra16MB, DC 2D conversion according to EQ. (8) is additionally performed:

$$T_{ibx}(x,y) = \begin{pmatrix} 1 & 1 & 1 & 1 \\ 2 & 1 & -1 & -2 \\ 1 & -1 & -1 & 1 \\ 1 & -2 & 2 & -1 \end{pmatrix} \begin{pmatrix} pe_{idx}(0,0) & pe_{idx}(0,1) & pe_{idx}(0,2) & pe_{idx}(0,3) \\ pe_{idx}(1,0) & pe_{idx}(1,1) & pe_{idx}(1,2) & pe_{idx}(1,3) \\ pe_{idx}(2,0) & pe_{idx}(2,1) & pe_{idx}(2,2) & pe_{idx}(2,3) \\ pe_{idx}(3,0) & pe_{idx}(3,1) & pe_{idx}(3,2) & pe_{idx}(3,3) \end{pmatrix} \begin{pmatrix} 1 & 2 & 1 & 1 \\ 1 & 1 & -1 & -2 \\ 1 & -1 & -1 & 2 \\ 1 & -2 & 1 & -1 \end{pmatrix}, \quad (7)$$

Figure 8:
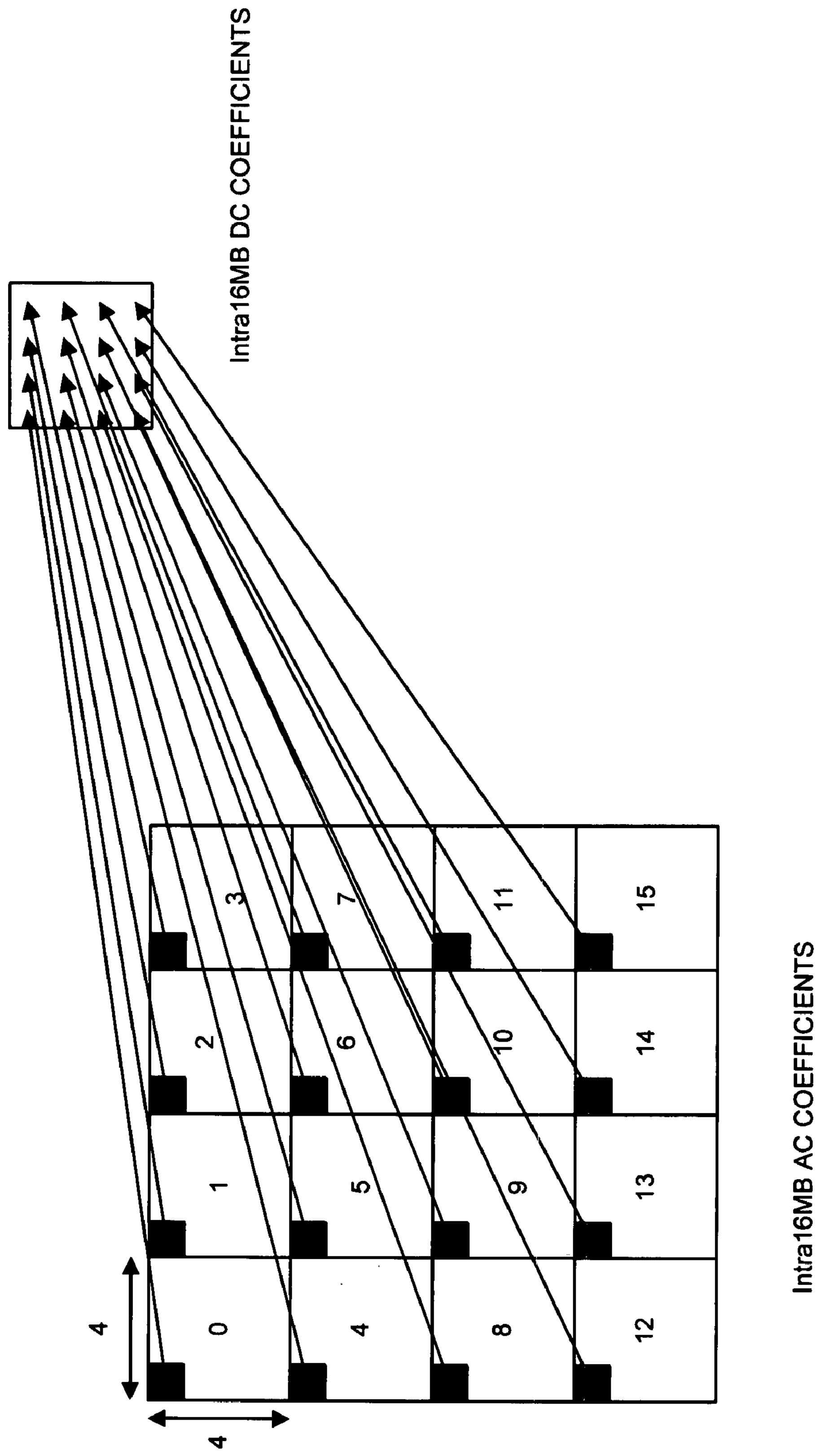
FIG. 8 is a diagram for explaining a structure of Intra16 MB encoding.

-continued $$TDC(x, y) = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} T_0(0,0) & T_1(0,0) & T_2(0,0) & T_3(0,0) \\ T_4(0,0) & T_5(0,0) & T_6(0,0) & T_7(0,0) \\ T_8(0,0) & T_9(0,0) & T_{10}(0,0) & T_{11}(0,0) \\ T_{12}(0,0) & T_{13}(0,0) & T_{14}(0,0) & T_{15}(0,0) \end{pmatrix} \begin{pmatrix} 1 & 1 & 1 & 1 \\ 1 & 1 & -1 & -1 \\ 1 & -1 & -1 & 1 \\ 1 & -1 & 1 & -1 \end{pmatrix} // 2, \quad (8)$$

where the symbol "//" in EQ. (8) represents rounding off. For Intra16MB, as shown in FIG. 8, DC coefficients ($T_{idx}(0, 0)$) in 4×4 blocks of the index 'idx' are gathered in another 4×4 block (which will be referred to as a DC block hereinbelow) for further conversion.

Next, quantization of a transform coefficient will be described. If a 4×4 block is a DC block, DC coefficient quantization according to EQ. (9) is performed; otherwise, a level is calculated by coefficient quantization according to EQ. (10):

$$LDC(x, y) = (TDC(x, y) \times Q(qp \% 6, 0, 0) + f(TDC(x, y)) \times 2^{(16+qp/6)}) / 2^{(16+qp/6)}, \quad (9)$$

$$L_{idx}(x, y) = (T_{idx}(x, y) \times Q(qp \% 6, x, y) + f(T_{idx}(x, y)) \times 2^{(15+qp/6)}) / 2^{(15+qp/6)}, \quad (10)$$

$$Q(m, x, y) = \begin{cases} M_{0,m} & \text{if } (x, y) = \{(0,0), (0,2), (2,0), (2,2)\} \\ M_{1,m} & \text{else if } (x, y) = \{(1,1), (1,3), (3,1), (3,3)\} \\ M_{2,m} & \text{else,} \end{cases} \quad (11)$$

$$M = \begin{bmatrix} 13107 & 5243 & 8066 \\ 11916 & 4660 & 7490 \\ 10082 & 4194 & 6554 \\ 9362 & 3647 & 5825 \\ 8192 & 3355 & 5243 \\ 7282 & 2893 & 4559 \end{bmatrix}, \text{ and} \quad (12)$$

$$f(x) = \begin{cases} fintra & \ldots \text{ if } (x \geq 0 \text{ \&\& Intra-frame prediction}) \\ -fintra & \ldots \text{ else if } (x < 0 \text{ \&\& Intra-frame prediction}) \\ finter & \ldots \text{ else if } (x \geq 0 \text{ \&\& Inter-frame prediction}) \\ -finter & \ldots \text{ else } (x < 0 \text{ \&\& Inter-frame prediction}), \end{cases} \quad (13)$$

where 'qp' $\{0 \leqq qp \leqq 51\}$ is a quantizing parameter supplied by the bit-rate control apparatus 106, and 'fintra' and 'finter' in EQ. (13) are parameters for determining the rounding position for quantization. In the JM scheme, fintra=⅓ and finter=⅙.

The foregoing is the operation of conversion and quantization in the JM scheme.

Figure 9:
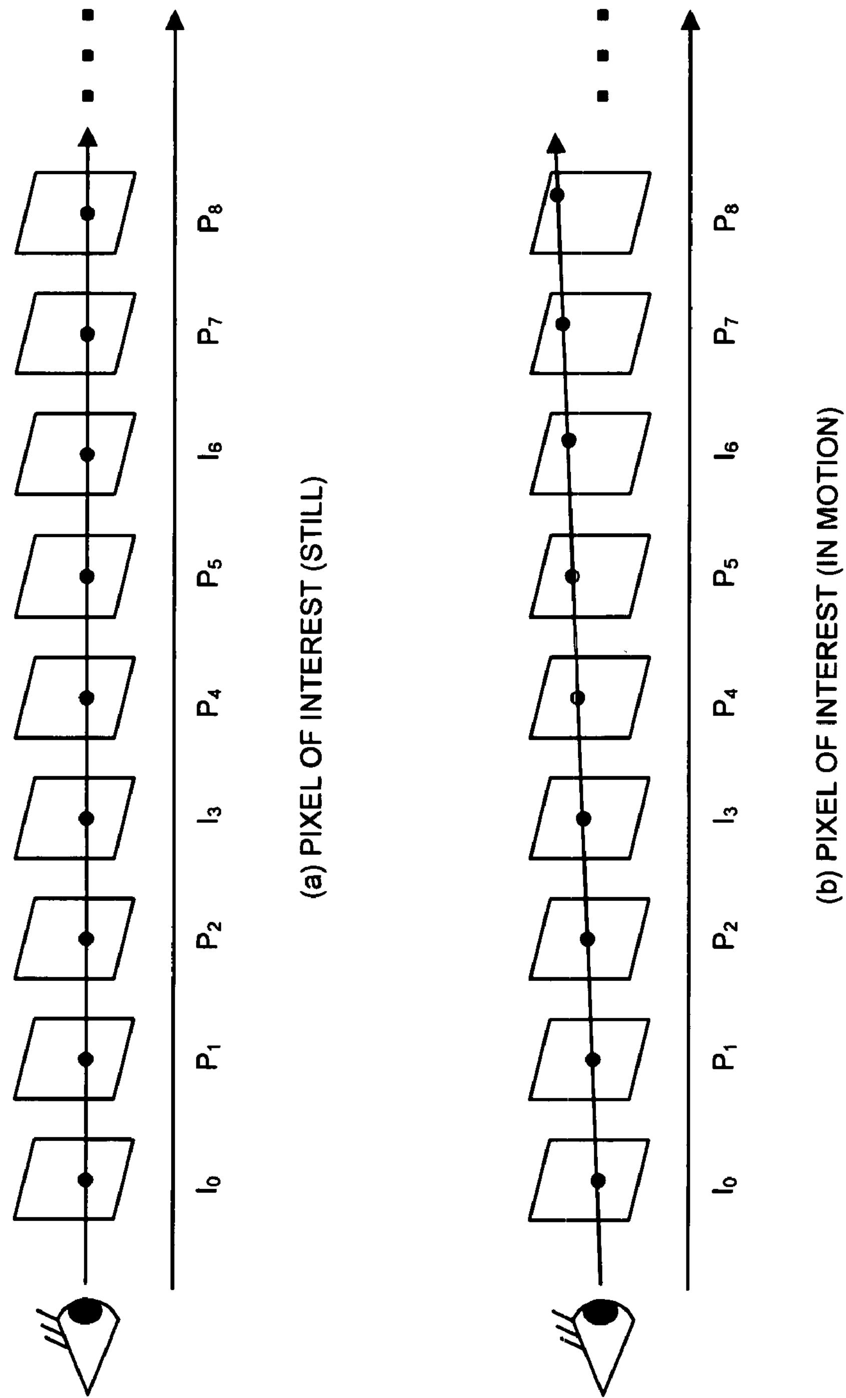
FIG. 9 is a diagram for explaining a pixel of interest.

How the conventional encoding causes variation of a pixel of interest in FIG. 9 will be described with reference to FIG. 10. Referring to FIG. 9, the pixel of interest may be a pixel in a still region or a pixel in a moving region. In general, the human visual characteristic is said to be sensitive to a still region and insensitive to a moving region. However, the human visual characteristic may be sensitive even to a pixel in a moving region if human eyes follow it.

Figure 10:
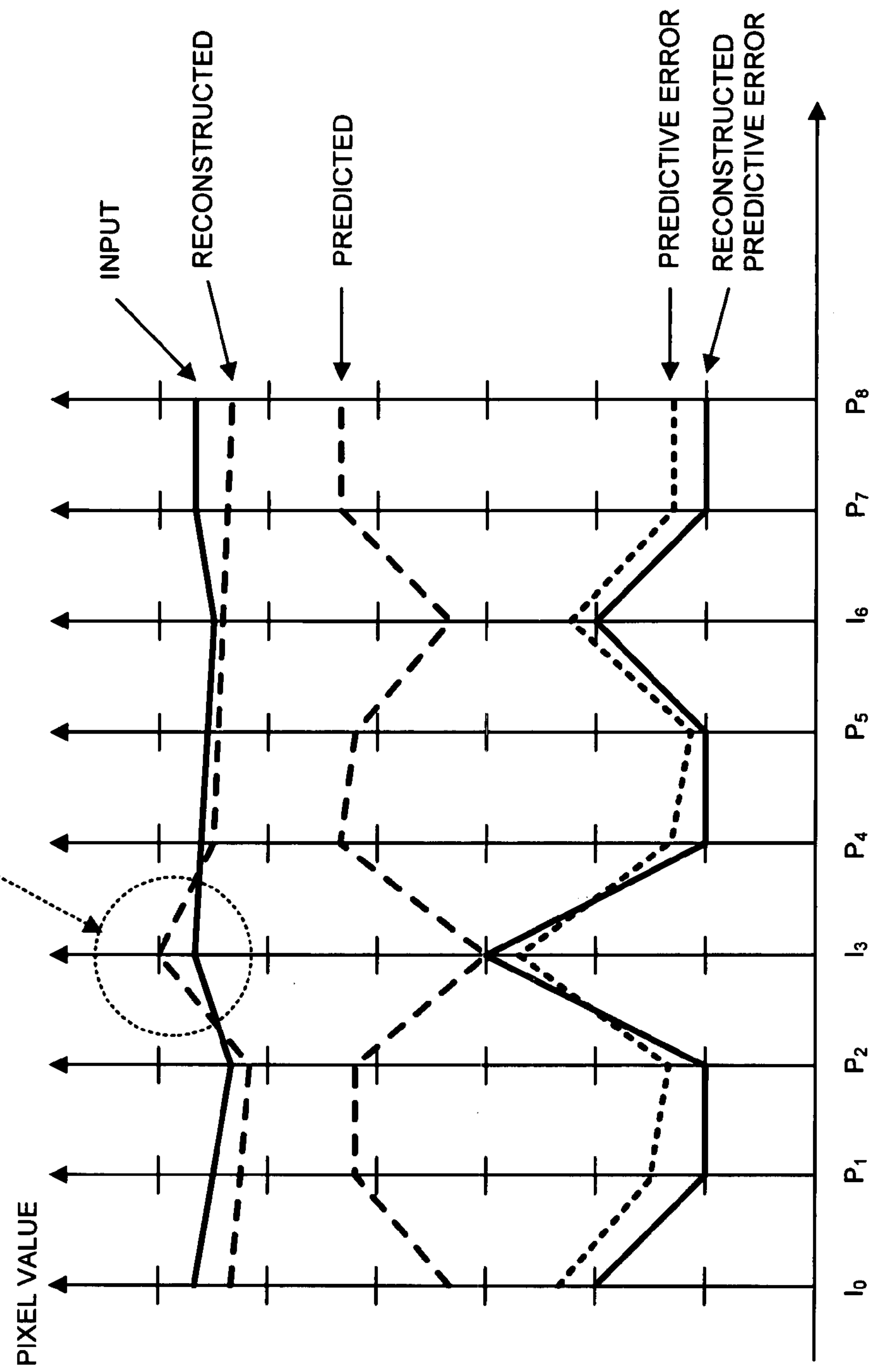
FIG. 10 is a diagram for explaining generation of I-frame flickering in a conventional method.

In FIG. 10, there are plotted in a time series an input value org(t, $vpx_t$, $vpy_t$), a reconstructed value rec(t, $vpx_t$, $vpy_t$), a predicted value pred(t, $vpx_t$, $vpy_t$), a predictive error pe(t, $vpx_t$, $vpy_t$), a reconstructed predictive error recpe(t, $vpx_t$, $vpy_t$) for a pixel of interest, where ($vpx_t$, $vpy_t$) represent coordinates of the pixel of interest within an image frame at a time 't,' and these pixels have the relationship as follows:

$$pe(t, vpx_t, vpy_t) = org(t, vpx_t, vpy_t) - pred(t, vpx_t, vpy_t) \quad (14),$$

$$recpe(t, vpx_t, vpy_t) = IQIT[Q[T[pe(t, vpx_t, vpy_t)]]] \quad (15),$$

and $$rec(t, vpx_t, vpy_t) = pred(t, vpx_t, vpy_t) + recpe(t, vpx_t, vpy_t) \quad (16),$$

where T[ ] is a symbol representing conversion processing, Q[ ] is a symbol representing quantization processing, and IQIT[ ] is a symbol representing inverse-quantization/inverse-conversion processing.

Referring to FIG. 10, whereas the input pixel of interest relatively smoothly varies, the pixel of interest in a reconstructed $I_3$ frame has a steep variation in its pixel value.

The steep variation in pixel value in an I-frame, i.e., I-frame flickering, is caused by intra-encoding in which an input is simply reproduced with fidelity without taking account of continuity of a pixel of interest along a time axis.

The present invention, which will be described hereinbelow, reduces I-frame flickering at issue as described above by, when intra-encoding an image, performing intra-encoding taking account of the noise pattern in inter-encoding of an image encoded using inter-encoding, i.e., taking account of continuity of a pixel of interest along a time axis. In the following description, the "intra-encoding taking account of the noise pattern in inter-encoding of an image encoded using inter-encoding" will be sometimes referred to as "intra-encoding taking account of continuity along a time axis."

An inventive moving picture encoding apparatus in accordance with the present embodiment will be described with reference to FIG. 11.

The inventive scheme shown in FIG. 11 comprises, in addition to the conventional scheme in FIG. 2, an I-frame flickering suppression control apparatus 300. Moreover, the internal operation of the converting/quantizing apparatus 200 is different from the conventional one in an I-frame flickering suppression control signal supplied by the I-frame flickering suppression control apparatus 300 and a reference predictive error that is a difference between a corrected reference image and an intra-frame predicted value.

Since this scheme is similar to the conventional one except the I-frame flickering suppression control apparatus 300 and converting/quantizing apparatus 200, only the I-frame flickering suppression control apparatus 300 and converting/quantizing apparatus 200 will be described below for simplifying the explanation.

First, the I-frame flickering suppression control apparatus 300 in accordance with the present embodiment will be described.

An outline of the operation of the I-frame flickering suppression control apparatus 300 in accordance with the present embodiment involves: applying, to an image to be intra-encoded, inter-frame prediction with an image frame that was encoded using inter-encoding and reconstructed in the past (which will be referred to as corrected-reference-image-producing reference frame hereinbelow), conversion, quantization, inverse-quantization, and inverse-conversion to generate an inter-encoded reconstructed image recInter(t, $vpx_t$, $vpy_t$), and outputting it as a corrected reference image. This is formulated as EQ. (17) below:

$$recInter(t,vpx_t,vpy_t)=IDIT[Q[T[org(t,vpx_t,vpy_t)-pInter(t,vpx_t vpy_t)]]]+pInter(t,vpx_t,vpy_t) \quad (17).$$

Moreover, recInter(t, $vpx_t$, $vpy_{tt}$) in EQ. (17) may be subjected to noise-removing filtering by the in-loop filter 108 as follows:

$$recInter(t,vpx_t,vpy_{tt})=LP[recInter(t,vpx_t,vpy_{tt})] \quad (18).$$

Figure 12:
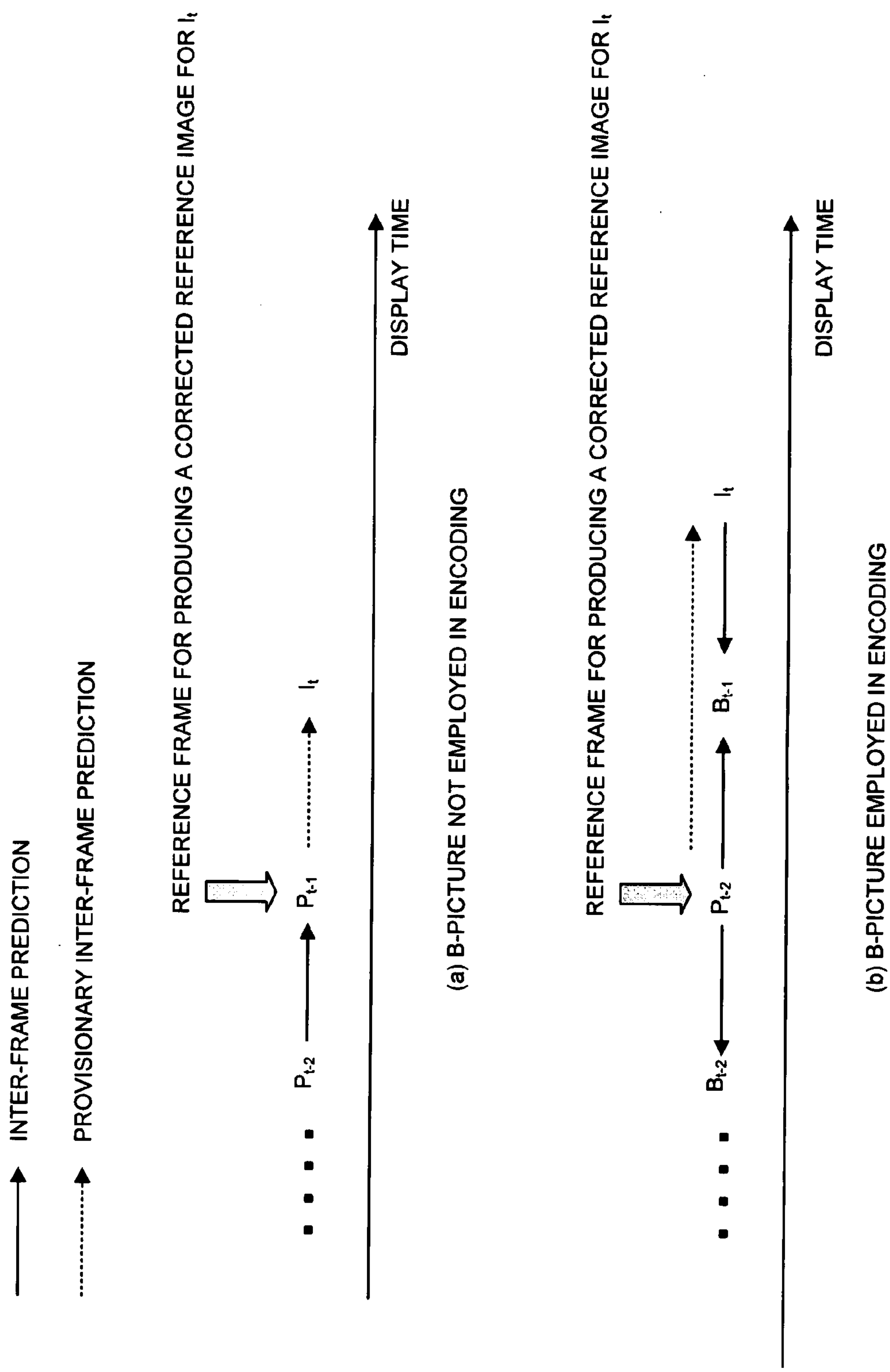
FIG. 12 is a diagram for explaining a corrected-reference-image-producing reference frame.

It should be noted that the aforementioned corrected-reference-image-producing reference frame is preferably an image frame that has the highest inter-frame correlation with the image frame to be intra-encoded. Thus, a smaller inter-frame distance normally gives a higher inter-frame correlation. Accordingly, in encoding without using a B-frame, a P-frame encoded immediately before is most suitable (see FIG. 12(*a*)). In a case in which lighting flash or the like has occurred in the immediately preceding P-frame, for example, a next preceding P-frame may be used.

On the other hand, in encoding using a B-frame, the B-frame is usually quantized coarser than an I- or P-frame. Therefore, in such a case, the corrected-reference-image-producing reference frame used is more preferably an immediately preceding P-frame that has been encoded with modest image quality than the coarsely quantized B-frame (see FIG. 12(*b*)).

The explanation of an outline of the operation of the I-frame flickering suppression control apparatus 300 in accordance with the present embodiment is now completed.

Next, input/output of the I-frame flickering suppression control apparatus 300 in accordance with the present embodiment will now be explained.

Inputs to the I-frame flickering suppression control apparatus 300 are a pixel in an input MB supplied by the MB buffer 101, an inter-frame predicted value supplied by the inter-frame predicting apparatus 111, a quantizing parameter supplied by the bit-rate control 106, and a motion vector and an MB type supplied by the predicting scheme estimating apparatus 112. On the other hand, outputs are an I-frame flickering suppression control signal supplied to the converting/quantizing apparatus 200, a corrected reference image supplied to the converting/quantizing apparatus 200 after subtracting an intra-frame predicted value therefrom, and a motion vector estimation control signal for controlling the predicting scheme estimating apparatus 112.

Next, the configuration of the I-frame flickering suppression control apparatus 300 in accordance with the present embodiment will be described with reference to FIG. 13.

Figure 13:
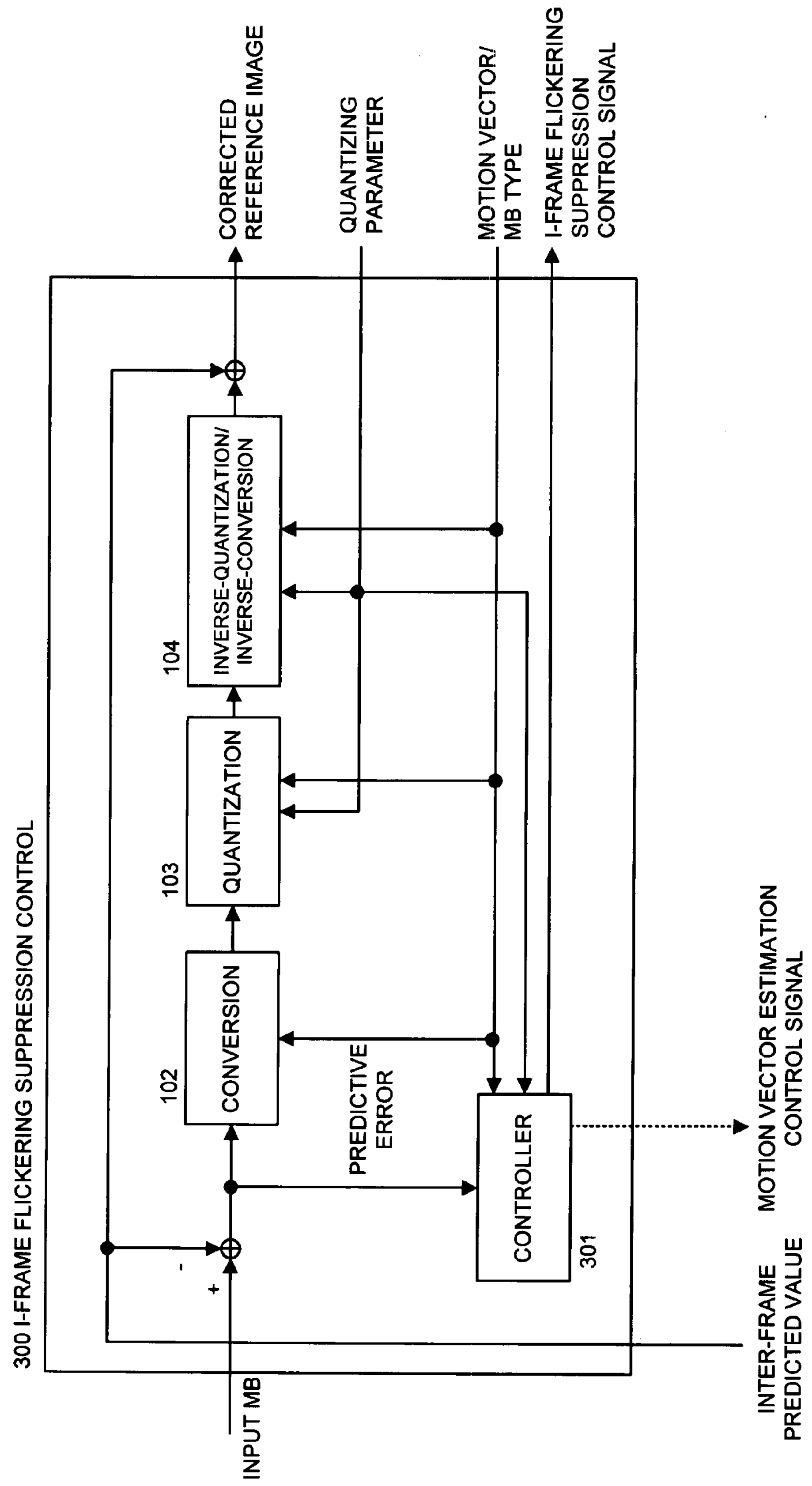
FIG. 13 is a block diagram of an I-frame flickering suppression control apparatus in Embodiment 1.

Referring to the I-frame flickering suppression control apparatus in FIG. 13, it comprises a converting apparatus 102, a quantizing apparatus 103, an inverse-quantizing/inverse-converting apparatus 104, and a controller 301.

The controller 301 calculates an I-frame flickering suppression control signal from a supplied quantization parameter, a motion vector and an MB type, and a difference between an input MB and an inter-frame predicted value.

The I-frame flickering suppression control signal is information that indicates "to which region in an image frame intra-encoding taking account of continuity along a time axis is to be applied."

If the predicting scheme estimating apparatus 112 is at an I-frame and the inter-frame predicting scheme estimation (processing of detecting a set of a motion vector and an inter-MB type from the corrected-reference-image-producing reference frame that minimizes an inter-frame predictive error with respect to an input MB) is stopped, the controller 301 operates the inter-frame predicting scheme estimation by a motion vector estimation control signal.

The converting apparatus 102 converts a difference between the input MB and inter-frame predicted value, and supplies a transform coefficient to the quantizing apparatus 103.

The quantizing apparatus 103 quantizes the transform coefficient at a quantization step size corresponding to the supplied quantization parameter, and calculates a level.

The inverse-quantizing/inverse-converting apparatus 104 inversely quantizes the level supplied by the quantizing apparatus 103, inversely frequency-converts it into the original spatial domain, and calculates a reconstructed predictive error.

The reconstructed predictive error is added with the aforementioned inter-frame prediction to obtain an inter-encoded reconstructed image, which is output as a corrected reference image.

It should be noted that a reference predictive error will be generated later by subtracting an intra-frame predicted value from the corrected reference image outside the I-frame flickering suppression control apparatus 300. The reference predictive error is information that indicates "how continuous in a temporal direction intra-encoding taking account of continuity along a time axis is to be performed."

It should be noted that the converting apparatus 102, quantizing apparatus 103, inverse-quantizing/inverse-converting apparatus 104 in the I-frame flickering suppression control apparatus 300 are similar to those in the conventional scheme.

Figure 14:
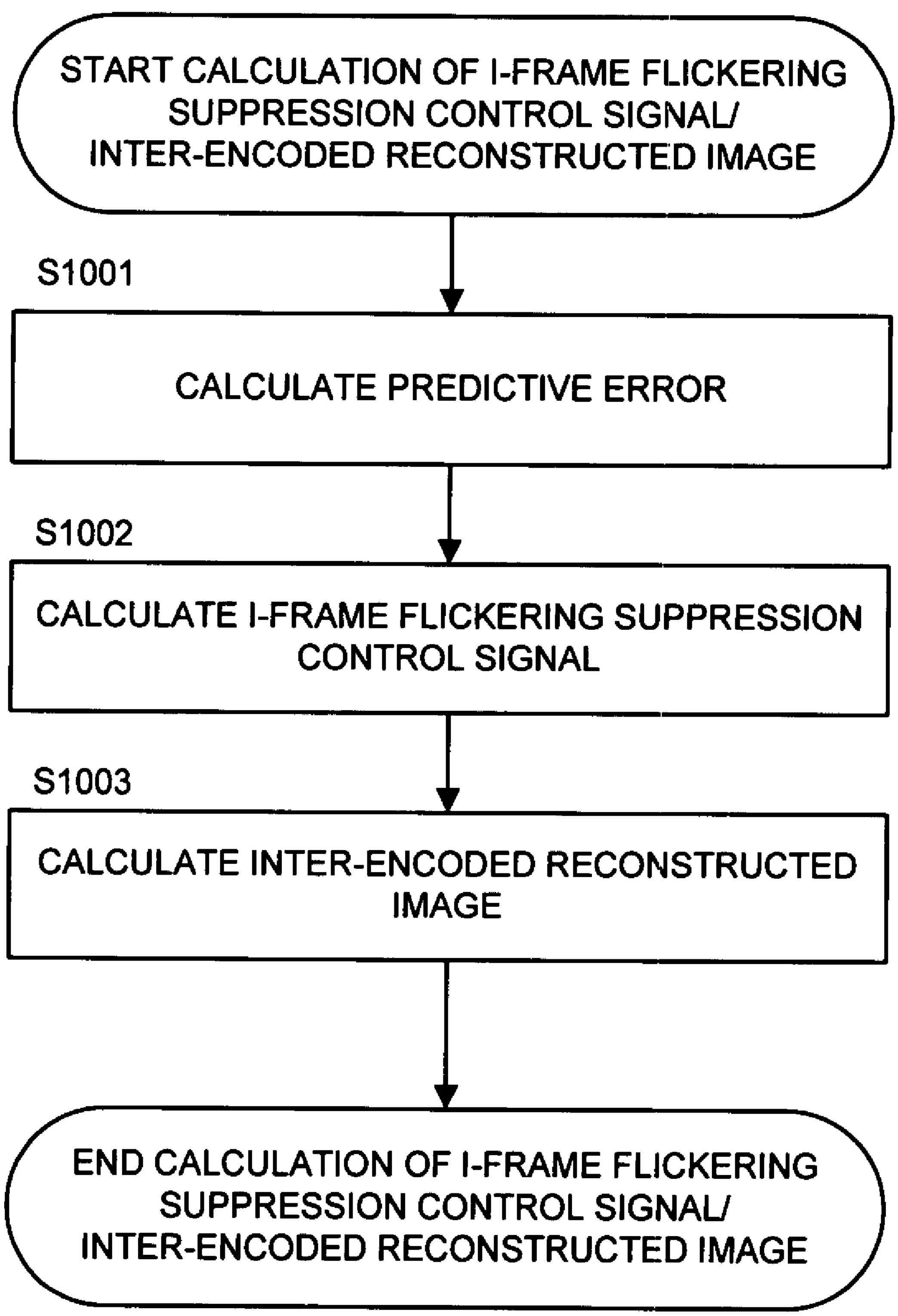
FIG. 14 is a flow chart of calculation of I-frame flickering suppression control signal and inter-encoded reconstructed image.

Next, the aforementioned operation will be described in more detail with reference to a flow chart in FIG. 14.

At Step S1001, a second predictive error $pe2_{idx}(x, y)$ $\{0 \leqq idx \leqq 15,\ 0 \leqq x \leqq 3,\ 0 \leqq y \leqq 3\}$ is calculated from a pixel value src(x, y) $\{0 \leqq x \leqq 15,\ 0 \leqq y \leqq 15\}$ of an input MB and an inter-frame predicted value $pInter_{idx}(x, y)$ $\{0 \leqq idx \leqq 15,\ 0 \leqq x \leqq 3,\ 0 \leqq y \leqq 3\}$ with a corrected-reference-image-producing reference frame according to EQ. (19):

$$pe2_{idx}(x,y)=src(b4x_{idx}+xb4_{idx}+y)-pInter_{idx}(x,y) \quad (19).$$

It should be noted that the second predictive error in the present embodiment is used merely within the I-frame flickering suppression control apparatus 300.

At Step S1002, an I-frame flickering suppression control signal IFlickerControl is calculated from the second predictive error $pe2_{idx}(x, y)$, MB type, and quantizing parameter 'qp' according to EQ. (20):

$$IFlickerControl = \begin{cases} 0 & \ldots \text{ if } (Spe2 > 256 \times Sth) \\ 1 & \ldots \text{ else if } (Intra4\ \text{MB or } (Intra16\ \text{MB and } qp < qpth1)) \\ 2 & \ldots \text{ else,} \end{cases} \quad (20)$$

$$Spe2 = \sum_{idx=0}^{15} \sum_{y=0}^{3} \sum_{x=0}^{3} |pe2_{idx}(x, y)|, \text{ and} \quad (21)$$

$$Sth = (\alpha \times (1 - finter) \times 2^{15+qp/6} / Q(qp\ \%\ 6, x, y)) / Tgain, \quad (22)$$

where qpth1 is a threshold of the quantizing parameter (which is 28 in the present embodiment), α is a value greater than zero, and Tgain is a gain for conversion (which is 16 in the present embodiment). When α is one, Sth is equal to the quantization dead-zone width in inter-encoding in a pixel spatial domain.

The I-frame flickering suppression control signal IFlickerControl=0 indicates "No correction is to be made on a transform coefficient," IFlickerControl=1 indicates "Correction is to be made on a transform coefficient but not on a DC transform coefficient," and IFlickerControl=2 indicates "Correction is to be made on all transform coefficients."

Since the processing according to EQ. (20) results in IFlickerControl being zero in a region discontinuous in a temporal direction (i.e., Spe2>256×Sth), this operation avoids a problem that "a region discontinuous in a temporal direction is forcibly encoded to be continuous."

At Step S1003, the second predictive error $pe2_{idx}(x, y)$ $\{0 \leqq idx \leqq 15, 0 \leqq x \leqq 3, 0 \leqq y \leqq 3\}$ is subjected to quantization, inverse-quantization, and inverse-conversion in a similar way to that in the conventional scheme to calculate a second reconstructed predictive error $recpe2_{idx}(x, y)$ $\{0 \leqq idx \leqq 15, 0 \leqq x \leqq 3, 0 \leqq y \leqq 3\}$. Moreover, an inter-frame predicted value $pInter_{idx}(x, y)$ is added to calculate an inter-encoded reconstructed image $recInter_{idx}(x, y)$ $\{0 \leqq idx \leqq 15, 0 \leqq x \leqq 3, 0 \leqq y \leqq 3\}$ according to EQ. (23):

$$recInter_{idx}(x,y)=recpe2_{idx}(x,y)+pInter_{idx}(x,y) \quad (23).$$

The explanation of the I-frame flickering suppression control apparatus 300 in accordance with the present embodiment is now completed.

It should be noted that the aforementioned inter-encoded reconstructed image is output as a corrected reference image to the outside of the I-frame flickering suppression control apparatus 300. From the corrected reference image is subtracted an intra-frame predicted value supplied by the intra-frame predicting apparatus 110 to calculate a reference predictive error $rpe_{idx}(x, y)$ $\{0 \leqq idx \leqq 15, 0 \leqq x \leqq 3, 0 \leqq y \leqq 3\}$ according to EQ. (24):

$$rpe_{idx}(x,y)=recInter_{idx}(x,y)-pIntra_{idx}(x,y) \quad (24).$$

According to the I-frame flickering suppression control apparatus 300, the information indicating how encoding is to be made so as to give a reconstructed image continuous in a temporal direction of an image to be intra-encoded (i.e., I-frame flickering suppression control signal), and the information indicating encoding is to be made so as to give a reconstructed image how continuous in a temporal direction of the image to be intra-encoded (i.e., reference predictive error) can be obtained.

The converting/quantizing apparatus 200 of the present invention, which will be described next, uses these information to perform encoding on a reconstructed image of an image to be intra-encoded taking account of continuity in a temporal direction.

The quantizing apparatus 200 in accordance with an embodiment of the present invention will now be described with reference to FIG. 15.

The quantizing apparatus 200 in accordance with an embodiment of the present invention comprises, in addition to the conventional components in FIG. 5, a transform coefficient correcting apparatus 201.

The transform coefficient correcting apparatus 201 corrects a transform coefficient and a DC transform coefficient supplied by the converting apparatus 102 based on an I-frame flickering suppression control signal supplied by the I-frame flickering suppression control apparatus 300, a reference predictive error obtained by subtracting an intra-frame predicted value from a corrected reference image, and a quantization parameter supplied by the bit-rate control apparatus 106, and supplies the corrected transform coefficient and corrected DC transform coefficient to the quantizing apparatus 103. That is, it adaptively corrects a quantized value (level) in intra-encoding.

A difference thereof from the converting/quantizing apparatus in FIG. 5 is merely in correction on a transform coefficient and a DC transform coefficient by the transform coefficient correcting apparatus 201. Therefore, only the transform coefficient correcting apparatus 201 will be described hereinbelow.

Figure 16:
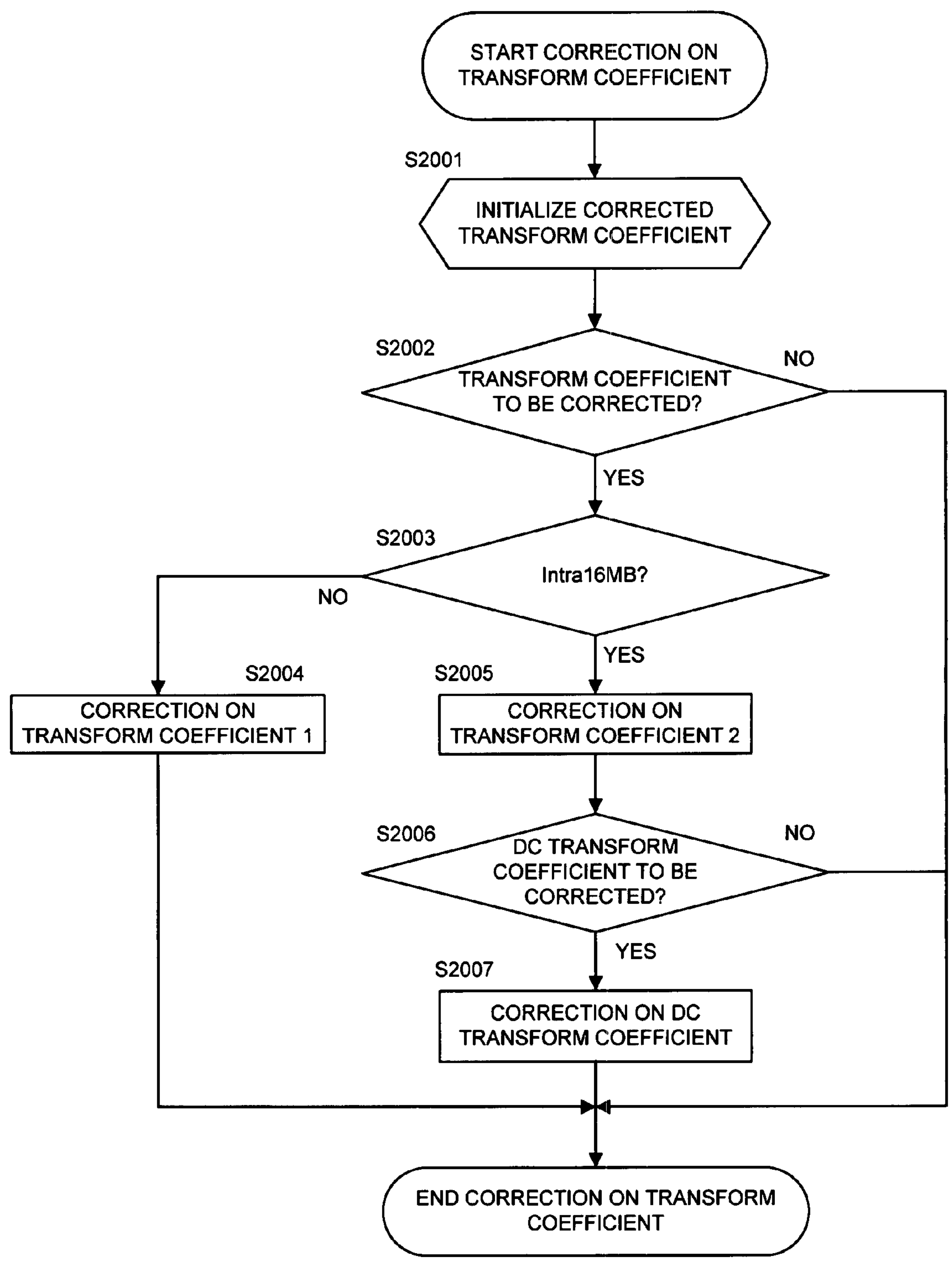
FIG. 16 is a flow chart of transform coefficient correction.

The operation of the process steps will be described with reference to a flow chart in FIG. 16, representing a quantizing parameter as 'qp,' an I-frame flickering suppression control signal as IFlickerControl, a reference predictive error as $rpe_{idx}(x, y)$ $\{0 \leqq idx \leqq 15, 0 \leqq x \leqq 3, 0 \leqq y \leqq 3\}$, a transform coefficient supplied by the converting apparatus 102 as $T_{idx}(x, y)$ $\{0 \leqq idx \leqq 15, 0 \leqq x \leqq 3, 0 \leqq y \leqq 3\}$, a DC transform coefficient as $TDC(x, y)$ $\{0 \leqq x \leqq 3, 0 \leqq y \leqq 3\}$, a corrected transform coefficient to be output as $T'_{idx}(x, y)$ $\{0 \leqq idx \leqq 15, 0 \leqq x \leqq 3, 0 \leqq y \leqq 3\}$, and a corrected DC transform coefficient to be output as $TDC'(x, y)$ $\{0 \leqq x \leqq 3, 0 \leqq y \leqq 3\}$.

At Step S2001, a corrected transform coefficient $T'_{idx}(x, y)$ and a corrected DC transform coefficient $TDC'(x, y)$ are initialized according to EQs. (25) and (26).

$$T'_{idx}(x,y)=T_{idx}(x,y) \quad (25),$$

and $$TDC'(x,y)=TDC'(x,y) \quad (26).$$

At Step S2002, a check is made as to whether the I-frame flickering suppression control signal IFlickerControl is zero or not. If IFlickerControl is not zero (that is, if the coefficient is to be corrected), the process goes to Step S2003; otherwise, the process is terminated.

At Step S2003, a check is made as to whether the transform coefficient to be corrected is Intra16MB or not. If it is not Intra16MB, the process goes to Step S2004; otherwise, goes to Step S2005.

At Step S2004, correction according to EQ. (27) below is applied to the transform coefficient for all idx's, x's and y's $\{0 \leqq idx \leqq 15, 0 \leqq x \leqq 3, 0 \leqq y \leqq 3\}$, and the process is then terminated.

$$T'_{idx}(x, y) = \begin{cases} RT_{idx}(x, y) & \ldots \text{ if } (conditionA(idx, x, y) = \text{True}) \\ T'_{idx}(x, y) & \ldots \text{ else} \end{cases}, \quad (27)$$

$$RT_{idx}(x, y) = \begin{pmatrix} 1 & 1 & 1 & 1 \\ 2 & 1 & -1 & -2 \\ 1 & -1 & -1 & 1 \\ 1 & -2 & 2 & -1 \end{pmatrix} \begin{pmatrix} rpe_{idx}(0,0) & rpe_{idx}(0,1) & rpe_{idx}(0,2) & rpe_{idx}(0,3) \\ rpe_{idx}(1,0) & rpe_{idx}(1,1) & rpe_{idx}(1,2) & rpe_{idx}(1,3) \\ rpe_{idx}(2,0) & rpe_{idx}(2,1) & rpe_{idx}(2,2) & rpe_{idx}(2,3) \\ rpe_{idx}(3,0) & rpe_{idx}(3,1) & rpe_{idx}(3,2) & rpe_{idx}(3,3) \end{pmatrix} \begin{pmatrix} 1 & 2 & 1 & 1 \\ 1 & 1 & -1 & -2 \\ 1 & -1 & -1 & 2 \\ 1 & -2 & 1 & -1 \end{pmatrix}, \quad (28)$$

$$conditionA(idx, x, y) = \begin{cases} \text{True} & \ldots \text{ if } (|T_{idx}(x, y) - RT_{idx}(x, y)| \leq Qsdz1(x, y)) \\ \text{false} & \ldots \text{ else,} \end{cases} \quad (29)$$

$$Qsdz1(x, y) = (1 - finter) \times Qs(x, y), \quad (31)$$

and $$Qs(x, y) = 2^{15+qp/6} / Q(qp \% 6, x, y), \quad (32)$$

where $Qsdz1(x, y)$ is a quantization dead-zone width in inter-encoding. By a decision of conditionA in EQ. (27) using this, the intra-encoded quantized values can be prevented from being excessively corrected (it will be easily recognized that although a larger value may be used as Qsdz1, the quantization dead-zone width in inter-encoding provides the most stable effect).

Moreover, the aforementioned correction may be made according to EQ. (33), in place of EQ. (27).

$$T'_{idx}(x,y) = \begin{cases} ope1(RT_{idx}(x,y), Qs(x,y), x, y) \\ \quad \ldots \text{ if } (conditionA(idx,x,y) = \text{True}) \text{, and} \\ T'_{idx}(x,y) \ldots \text{ else} \end{cases} \tag{33}$$

$$ope1(C, qs, x, y) = ((C + 0.5\times \text{sign}(C)\times qs)/qs) * qs, \tag{34}$$

where sign(C) is a function that returns −1 if C<0; otherwise, returns 1.

If conditionA(idx, x, y)=True in EQ. (27), a level obtained by quantizing a difference between a corrected reference image and an intra-frame predicted image becomes the level in intra-encoding. On the other hand, if conditionA(idx, x, y)=True in EQ. (33), a level obtained by quantizing a difference between a corrected reference image and an intra-frame predicted image with a rounding-off quantization property becomes the level in intra-encoding. Use of the rounding-off quantization property provides a reconstructed image continuous in a temporal direction in a more accurate manner.

At Step S2005, correction according to EQ. (27) is applied to the transform coefficient for all idx's, x's and y's $\{0 \leqq idx \leqq 15, 0 \leqq x \leqq 3, 0 \leqq y \leqq 3\}$ except x=y=0. It will be easily recognized that EQ. (33) may be used in place of EQ. (27).

At Step S2006, a check is made as to whether the I-frame flickering suppression control signal IFlickerControl is one or not. If it is not one (that is, if a DC transform coefficient is to be corrected), the process goes to Step S2007; otherwise, the process is terminated.

At Step S2007, correction according to EQ. (35) below is applied to the DC transform coefficient for all x's and y's $\{0 \leqq x \leqq 3, 0 \leqq y \leqq 3\}$, and the process is terminated.

$$TDC'_{idx}(x,y) = \begin{cases} RTDC_{idx}(x,y) & \ldots \text{ if } (conditionB(x,y) = \text{True}) \\ TDC'_{idx}(x,y) & \ldots \text{ else,} \end{cases} \tag{35}$$

$$RTDC(x,y) = \begin{pmatrix} 1 & 1 & 1 & 1 \\ 1 & 1 & -1 & -1 \\ 1 & -1 & -1 & 1 \\ 1 & -1 & 1 & -1 \end{pmatrix} \begin{pmatrix} RT_0(0,0) & RT_1(0,0) & RT_2(0,0) & RT_3(0,0) \\ RT_4(0,0) & RT_5(0,0) & RT_6(0,0) & RT_7(0,0) \\ RT_8(0,0) & RT_9(0,0) & RT_{10}(0,0) & RT_{11}(0,0) \\ RT_{12}(0,0) & RT_{13}(0,0) & RT_{14}(0,0) & RT_{15}(0,0) \end{pmatrix} \begin{pmatrix} 1 & 1 & 1 & 1 \\ 1 & 1 & -1 & -1 \\ 1 & -1 & -1 & 1 \\ 1 & -1 & 1 & -1 \end{pmatrix} // 2 \tag{36}$$

$$conditionB(x,y) = \begin{cases} \text{True} & \ldots \text{ if } (|TDC(x,y) - RTDC(x,y)| \leq Qsdz2(x,y)) \\ \text{false} & \ldots \text{ else,} \end{cases} \tag{37}$$

$$Qsdz2(x,y) = (1 - finter) \times QsDC(x,y), \text{ and} \tag{38}$$

$$QsDC(x,y) = 2^{16+qp/6} / Q(qp \,\%\, 6, 0, 0), \tag{39}$$

where Qsdz2(x, y) is a quantization dead-zone width in inter-encoding in a DC conversion domain. By a decision of conditionB in EQ. (35) using this, the intra-encoded quantized values can be prevented from being excessively corrected (it will be easily recognized that although a larger value may be used as Qsdz2, the quantization dead-zone width in inter-encoding in the DC conversion domain provides the most stable effect).

Moreover, the aforementioned correction on the DC transform coefficient may be calculated according to EQ. (40), in place of EQ. (35):

$$TDC'_{idx}(x,y) = \begin{cases} ope1(RTDC(x,y), QsDC(x,y), x, y) \\ \quad \ldots \text{ if } (conditionB(x,y) = \text{True}) \\ TDC'_{idx}(x,y) \ldots \text{ else.} \end{cases} \tag{40}$$

If conditionB (x, y)=True in EQ. (35), a level obtained by quantizing a difference between a corrected reference image and an intra-frame predicted image becomes the level in intra-encoding. On the other hand, if conditionB (x, y)=True in EQ. (40), a level obtained by quantizing a difference between a corrected reference image and an intra-frame predicted image with a rounding-off quantization property becomes the level in intra-encoding. Use of the rounding-off quantization property provides a reconstructed image continuous in a temporal direction in a more accurate manner.

The explanation of the transform coefficient correcting apparatus 201 is now completed.

Figure 17:
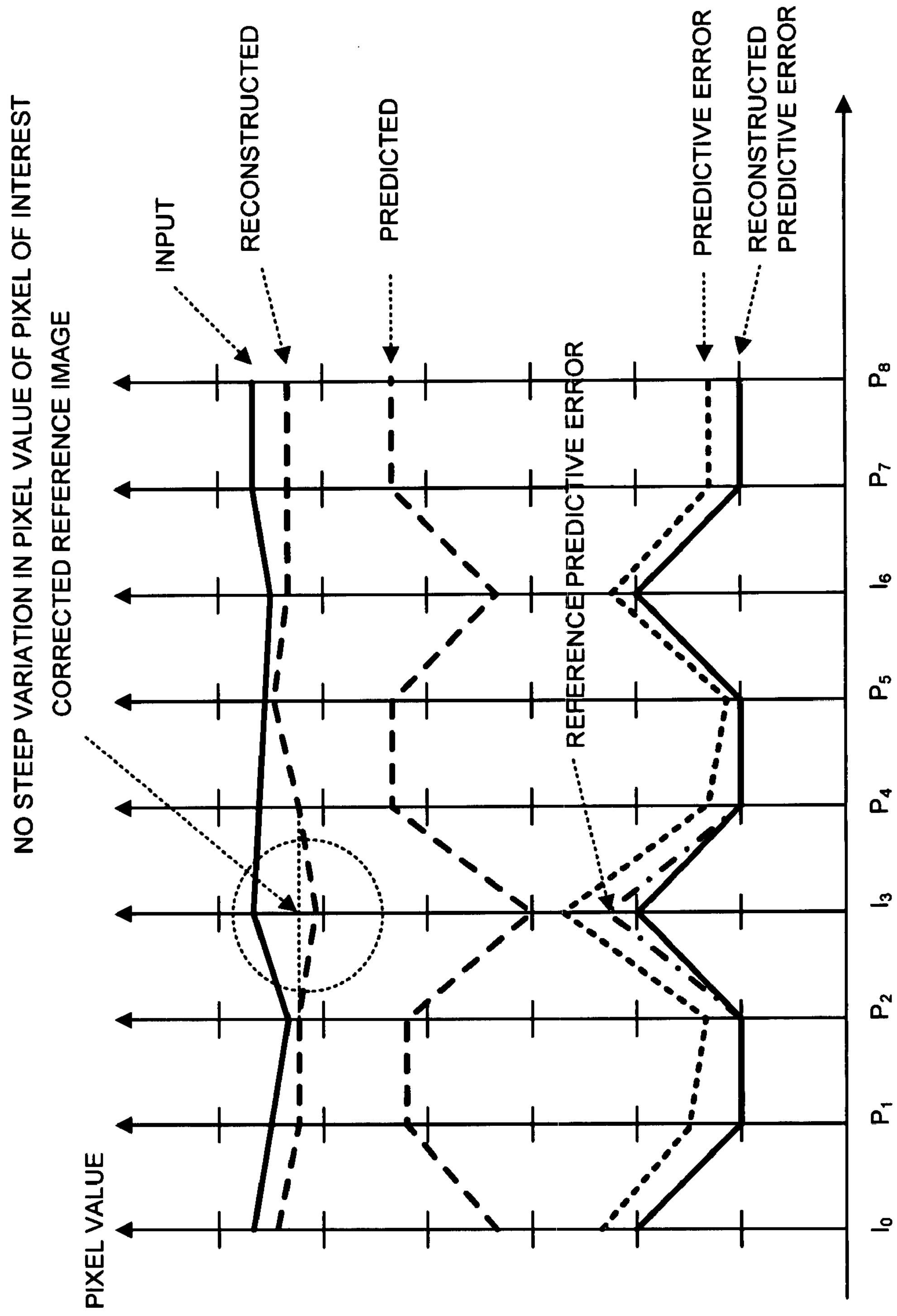
FIG. 17 is a diagram for explaining an effect of the present invention.

As an example demonstrating the effect of the moving picture encoding apparatus in accordance with the invention described above, transition of a pixel of interest in an $I_3$ frame in FIG. 9 is shown in FIG. 17 in which a reference predictive error of the pixel of interest is defined as:

$$rpe(3, vpx_3, vpy_3) = \text{recInter}(3, vpx_2, vp_2) - \text{pIntra}(3, vpx_3, vpy_3) \tag{41}$$

to perform encoding taking account of continuity of a reconstructed pixel.

By the effect of the invention, a transform coefficient for a predictive error is corrected by a transform coefficient for a reference predictive error to give a reconstructed predictive error of the pixel of interest in the 13 frame as given by EQ. (42) below:

$$\text{recpe}(3, vpx_3, vpy_3) = IQIT[Q[T[rpe(3, vpx_3, vpy_3)]]] \tag{42}$$

Thus, the reconstructed predictive error in the inventive case (FIG. 17) is smaller than that in the conventional case (FIG. 10) by a quantization width. Consequently, a steep variation of a pixel of interest in the $I_3$ frame, which was encountered in the conventional case, is suppressed according to the present invention.

Moreover, the reference predictive error is generated from an inter-encoded image, the aforementioned effect can be obtained whether the pixel of interest lies in a still region or in a moving region. Furthermore, the reference predictive error is calculated on a block-by-block basis, I-frame flickering suppression as described above is adaptively applied for each block in an image frame.

That is, the present invention can achieve effective reduction of I-frame flickering when a moving picture is encoded using not only I-frames but also using inter-frame prediction such as that in P- and B-frames, and even when a moving picture containing scenes in motion and a moving region is encoded.

Embodiment 2

In the moving picture encoding apparatus in Embodiment 1 described above, the I-frame flickering suppression control apparatus 300 is required to perform processing of conversion, quantization, inverse-quantization and inverse conversion to calculate a corrected reference image.

According to the present embodiment, a simplified I-frame flickering suppression control apparatus 300 of which the conversion, quantization, inverse-quantization and inverse conversion are not required will be described.

Since the moving picture encoding apparatus of the present embodiment has similar components to those in Embodiment 1 except the I-frame flickering suppression control apparatus 300, only the I-frame flickering suppression control apparatus 300 in accordance with the present embodiment will be addressed for simplifying the explanation.

Figure 18:
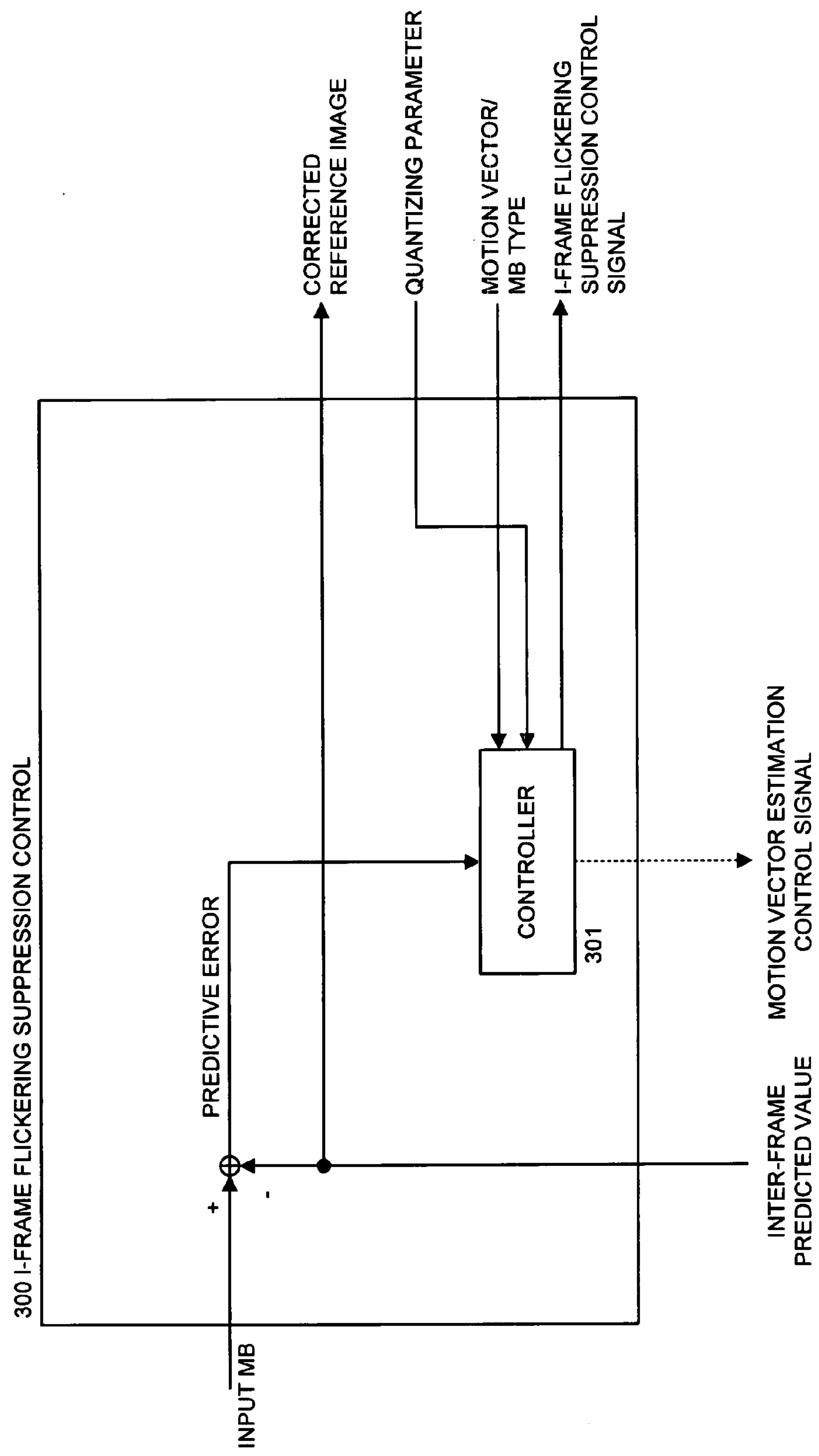
FIG. 18 is a block diagram of an I-frame flickering suppression control apparatus in Embodiment 2.

Now the configuration of the I-frame flickering suppression control apparatus 300 in the present embodiment will be described with reference to FIG. 18.

As compared with Embodiment 1, the converting apparatus 102, quantizing apparatus 103, inverse-quantizing/inverse-converting apparatus 104 are eliminated. The controller 301 is similar to that in Embodiment 1.

From this structure, a corrected reference image obtained in the present embodiment is an inter-frame predicted image obtained in applying inter-frame prediction to an image to be intra-encoded with a corrected-reference-image-producing reference frame. In other words, the corrected reference image is equivalent to an inter-encoded reconstructed image with the first term in EQ. (17) nulled in Embodiment 1.

The principle based on which the first term in EQ. (17) is nulled is the tendency of "a predictive error to be small and nulled after quantization because an image continuous in a temporal direction has an inter-frame predicted image matched with that for a preceding image." This eliminates conversion, quantization, inverse-quantization and inverse conversion on the predictive error and accordingly reduces the computational cost to achieve similar performance to that of the I-frame flickering suppression control apparatus in the first embodiment.

Figure 19:
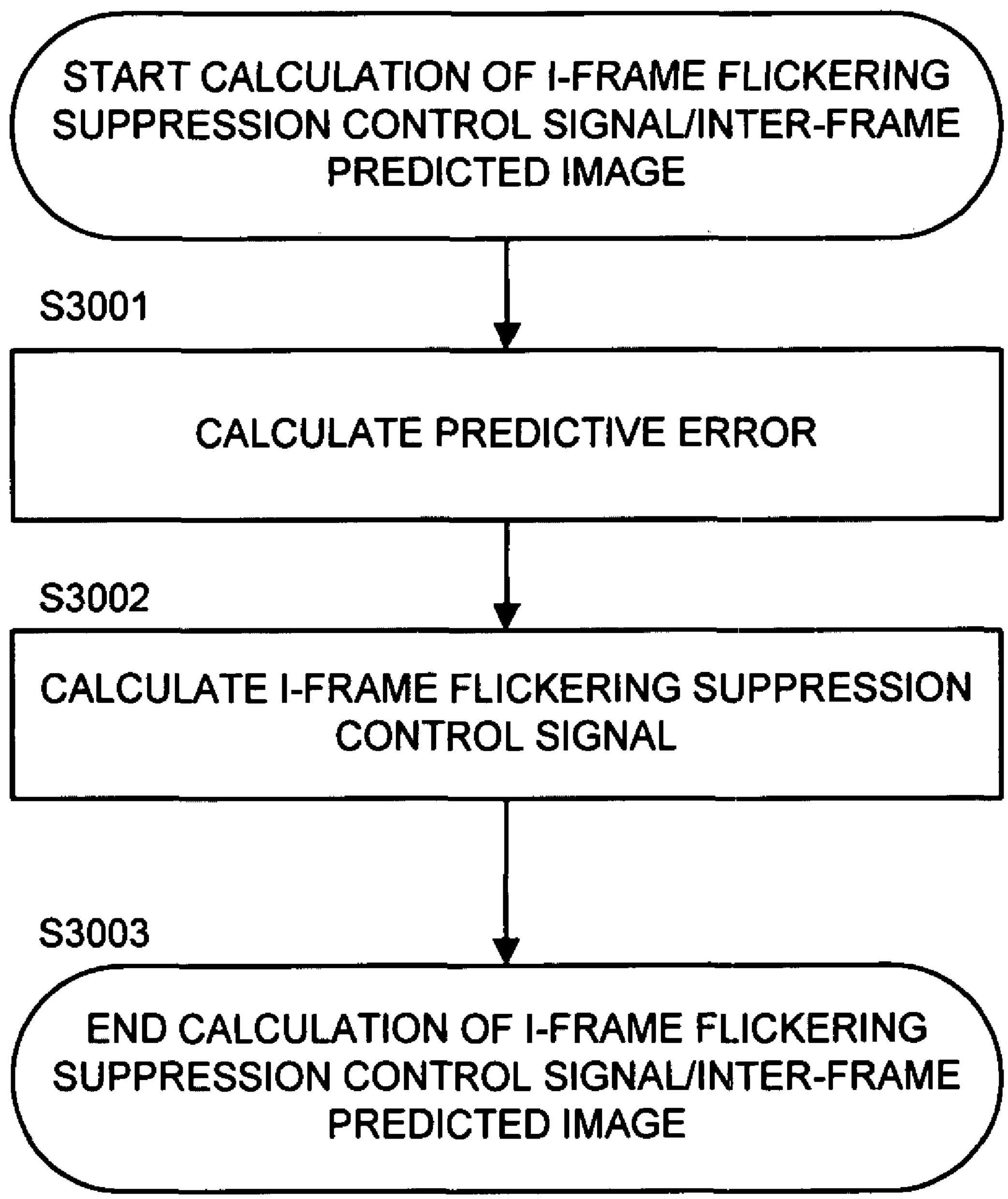
FIG. 19 is a flow chart of calculation of I-frame flickering suppression control signal and inter-frame predicted image.

Next, the operation of the I-frame flickering suppression control apparatus in accordance with the present embodiment will be described with reference to a flow chart in FIG. 19.

At Step S3001, a second predictive error $pe2_{idx}(x, y)$ $\{0 \leqq idx \leqq 15, 0 \leqq x \leqq 3, 0 \leqq y \leqq 3\}$ is calculated from a pixel value $src(x, y)$ $\{0 \leqq x \leqq 15, 0 \leqq y \leqq 15\}$ of an input MB and an inter-frame predicted value $pInter_{idx}(x, y)$ $\{0 \leqq idx \leqq 15, 0 \leqq x \leqq 3, 0 \leqq y \leqq 3\}$ with a corrected-reference-image-producing reference frame according to EQ. (19) (as in Step S1001):

$$pe2_{idx}(x,y)=src(b4x_{idx}+x, b4y_{idx}+y)-pInter_{idx}(x,y) \quad (19).$$

It should be noted that the second predictive error in the present embodiment is used merely within the I-frame flickering suppression control apparatus 300.

At Step S3002, an I-frame flickering suppression control signal IFlickerControl is calculated from the second predictive error $pe2_{idx}(x, y)$, MB type, and quantizing parameter 'qp' according to EQ. (20) (as in Step S1002):

$$IFlickerControl = \begin{cases} 0 \ \ldots \ \text{if } (Spe2 > Sth) \\ 1 \ \ldots \ \text{else if } (Intra4 \text{ MB or } (Intra16 \text{ MB and } qp < qpth1)), \\ 2 \ \ldots \ \text{else} \end{cases} \quad (20)$$

-continued $$Spe2 = \sum_{idx=0}^{15} \sum_{y=0}^{3} \sum_{x=0}^{3} |pe2_{idx}(x, y)|, \text{ and} \quad (21)$$

$$Sth = 8 \times (1 - finter) \times 2^{15+qp/6} / Q(qp \ \% \ 6, x, y), \quad (22)$$

where qpth1 is a threshold of the quantizing parameter (which is 28 in the present embodiment).

Moreover, the I-frame flickering suppression control signal IFlickerControl=0 indicates "No correction is to be made on a transform coefficient," IFlickerControl=1 indicates "Correction is to be made on a transform coefficient but not on a DC transform coefficient," and IFlickerControl=2 indicates "Correction is to be made on all transform coefficients."

Since the processing according to EQ. (20) results in IFlickerControl being zero in a region discontinuous in a temporal direction (i.e., Spe2>256×Sth), this operation avoids a problem that "a region discontinuous in a temporal direction is forcibly encoded to be continuous."

The explanation of the I-frame flickering suppression control apparatus 300 in accordance with the present embodiment is now completed.

It should be noted that the aforementioned inter-frame predicted value is output as a corrected reference image to the outside of the I-frame flickering suppression control apparatus 300. From the corrected reference image is subtracted an intra-frame predicted value supplied by the intra-frame predicting apparatus 110 to calculate a reference predictive error $rpe_{idx}(x, y)$ $\{0 \leqq idx \leqq 15, 0 \leqq x \leqq 3, 0 \leqq y \leqq 3\}$ according to EQ. (43):

$$rpe_{idx}(x,y)=pInter_{idx}(x,y)-pIntra_{idx}(x,y) \quad (43).$$

According to the I-frame flickering suppression control apparatus 300 of the present embodiment, an I-frame flickering suppression control signal and a reference predictive error can be obtained as in Embodiment 1.

Thus, as in Embodiment 1, the present embodiment achieves effective reduction of I-frame flickering when a moving picture is encoded using not only I-frames but also using inter-frame prediction such as that in P- and B-frames, and even when a moving picture containing scenes in motion is encoded.

Embodiment 3

This embodiment will address a moving picture encoding apparatus of the invention employing a converting/quantizing apparatus in which "the quantizing apparatus directly corrects the level based on a transform coefficient of a reference predictive error," unlike the converting/quantizing apparatus 200 in Embodiment 1 that "corrects a transform coefficient and quantizes the corrected transform coefficient."

Since only the internal configuration of the converting/quantizing apparatus 200 differs from that in the first or second embodiment, only the I-frame flickering suppression control apparatus 200 in the present embodiment will be described below for simplifying the explanation. (It will be easily recognized that the configuration of the I-frame flickering suppression control apparatus 300 may be either one in the first or second embodiment.)

Now the I-frame flickering suppression control apparatus 200 in accordance with the present embodiment will be described with reference to FIG. 20.

The converting/quantizing apparatus 200 in FIG. 20 comprises, in addition to the conventional components in FIG. 5, a converting apparatus 102B having the same function as that of the converting apparatus 102. The converting apparatus 102B converts a supplied reference predictive error, similarly to the predictive error in the converting apparatus 102, and outputs a reference transform coefficient and a reference DC transform coefficient.

It should be noted that the reference transform coefficient $RT_{idx}(x, y)$ {0≦idx≦15, 0≦x≦3, 0≦y≦3} and reference DC transform coefficient RTDC (x, y) {0≦x≦3, 0≦y≦3} are calculated according to EQ. (28) and EQ. (36), respectively.

A difference in operation of the present embodiment from the conventional one in FIG. 5 is merely in the coefficient quantizing apparatus 1031 and DC coefficient quantizing apparatus 1032.

Therefore, only the operation of the coefficient quantizing apparatus 1031 and DC coefficient quantizing apparatus 1032 will be addressed hereinbelow.

Figure 21:
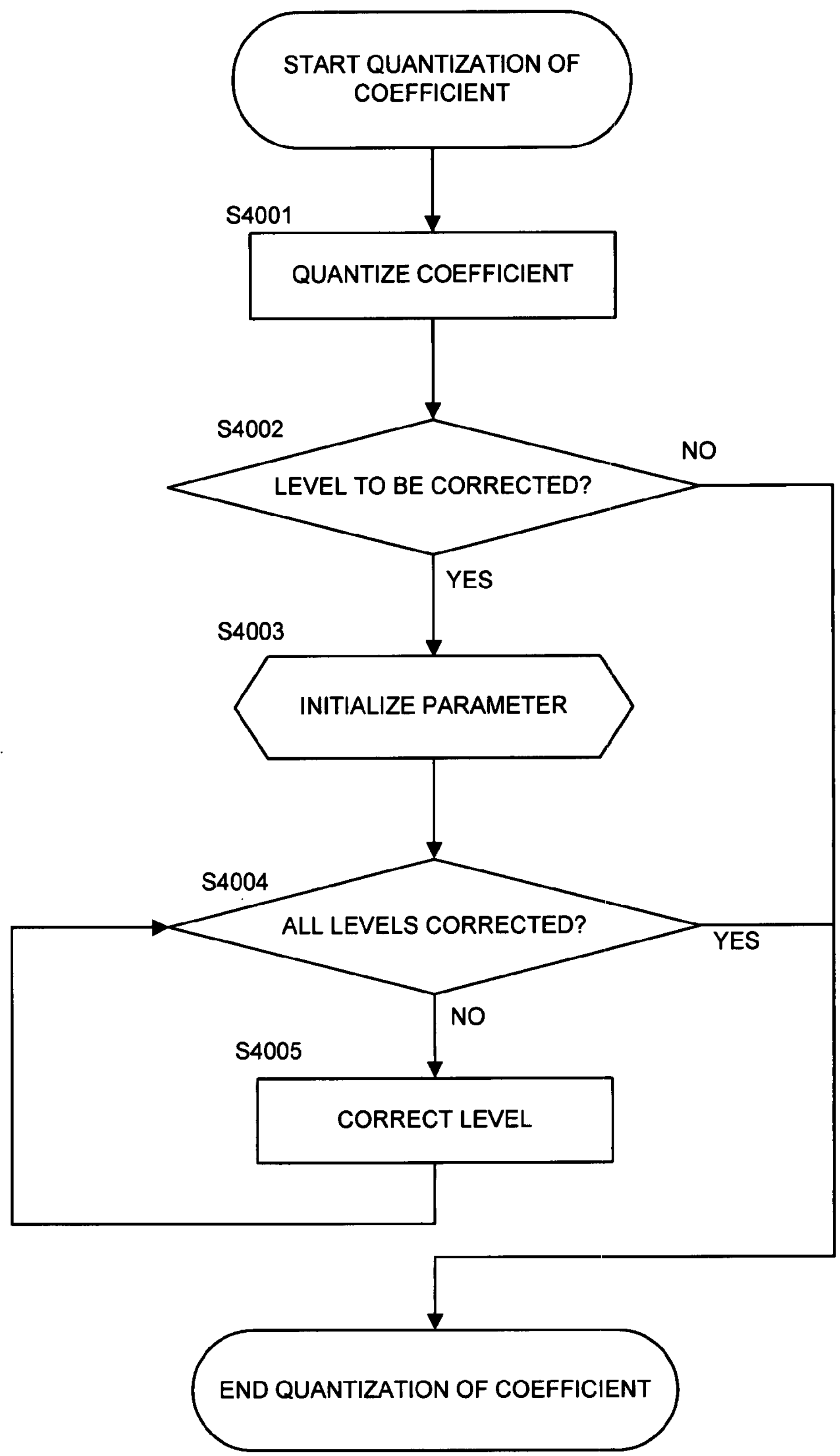
FIG. 21 is a flow chart of coefficient quantization.

The operation of the coefficient quantizing apparatus 1031 will now be described with reference to a flow chart in FIG. 21.

At Step S4001, all transform coefficients $T_{idx}(x, y)$ {0≦idx≦15, 0≦x≦3, 0≦y≦3} are quantized according to EQ. (10) to calculate levels $L_{idx}(x, y)$ {0≦idx≦15, 0≦x≦3, 0≦y≦3}.

It should be noted that the operation at Step S4001 is just the same as that in the conventional transform coefficient quantization, and subsequent operations from Step S4002 to Step S4005 are added according to the present invention.

At Step S4002, a check is made as to whether the I-frame flickering suppression control signal IFlickerControl is zero or not. If IFlickerControl is not zero (that is, if a coefficient is to be corrected), the process goes to Step S4003; otherwise, the process is terminated.

At Step S4003, a counter countL indicating the number of corrected coefficients is initialized to zero.

At Step S4004, a check is made as to whether or not a countL is 256 or more (that is, whether the coefficient has been corrected for all idx's, x's and y's {0≦idx≦15, 0≦x≦3, 0≦y≦3}), and if countL is 256 or more, the process is terminated; otherwise, goes to Step S4005.

At Step S4005, the level $L_{idx}(x, y)$ is corrected according to EQ. (44) below, countL is incremented by one, and the process goes to Step S4004.

$$L_{idx}(x, y) = \begin{cases} RL_{idx}(x, y) & \ldots \text{ if } (conditionA(idx, x, y) = \text{True}) \\ L_{idx}(x, y) & \ldots \text{ else} \end{cases} \quad (44)$$

$$RL_{idx}(x, y) = (ope1(RT_{idx}(x, y), Qs(x, y), x, y) \times Q(qp \,\%\, 6, x, y) + fintra \times \text{sign}(RT_{idx}(x, y))) \times 2^{(15+qp/6)}) / 2^{(15+qp/6)} \quad (45)$$

$$idx = \text{countL}/16 \quad (46)$$

$$\text{num} = \text{countL}\ \%16 \quad (47)$$

$$x = \text{num}\ \%4 \quad (48)$$

$$y = \text{num}/4 \quad (49)$$

The explanation of the coefficient quantizing apparatus 1031 in the present embodiment is now completed.

Figure 22:
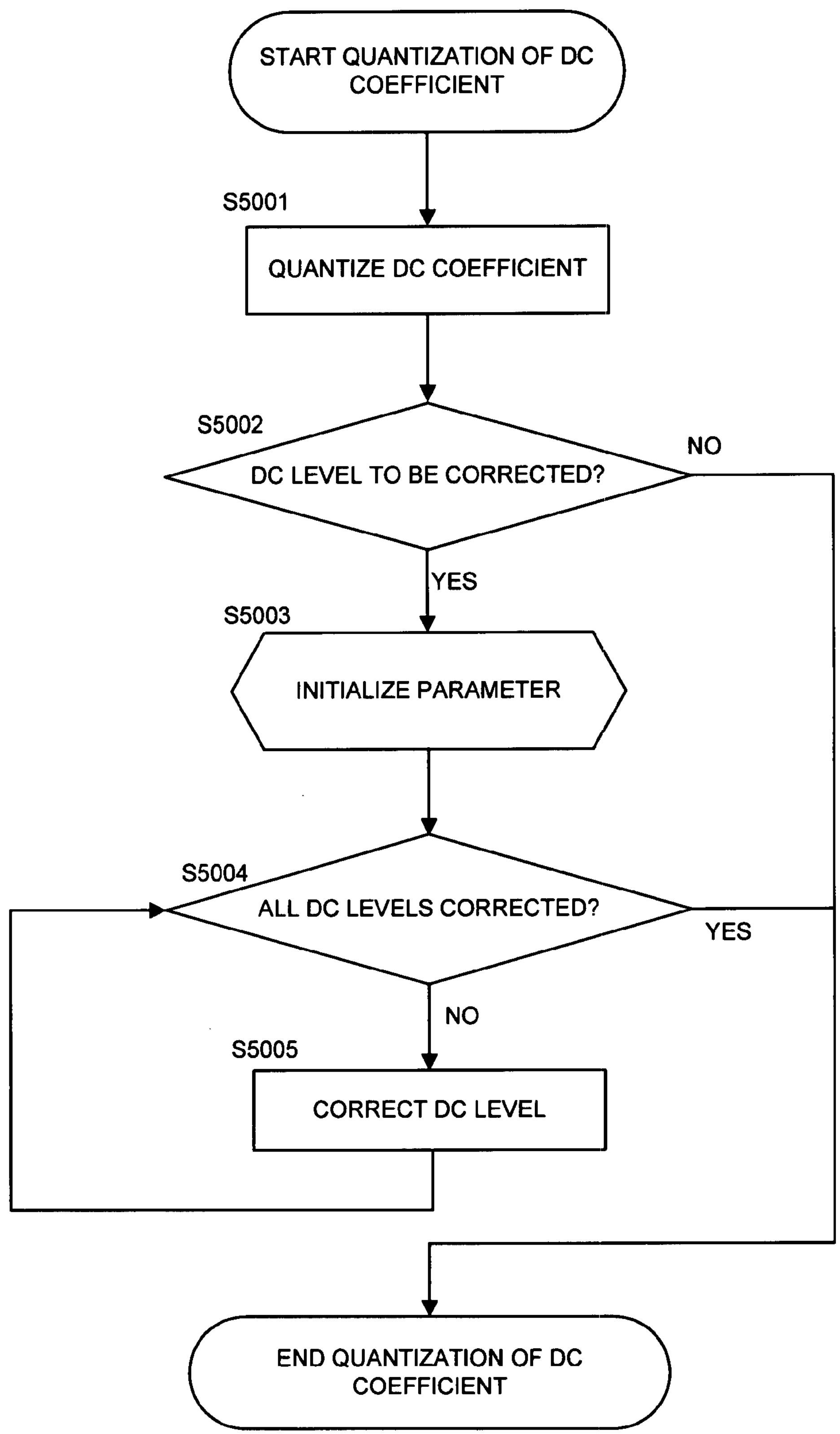
FIG. 22 is a flow chart of DC coefficient quantization.

Next, the operation of the DC coefficient quantizing apparatus 1032 will now be described with reference to a flow chart in FIG. 22.

At Step S5001, all DC transform coefficients TDC(x, y) {0≦x≦3, 0≦y≦3} are quantized according to EQ. (9) to calculate levels LDC(x, y) {0≦x≦3, 0≦y≦3}.

It should be noted that the operation at Step S5001 is just the same as that in the conventional DC coefficient quantization, and subsequent operations from Step S5002 to Step S5005 are added according to the present invention.

At Step S5002, a check is made as to whether or not the I-frame flickering suppression control signal IFlickerControl is one and the MB type is Intra16MB. If IFlickerControl is one and the MB type is Intra16MB (that is, if a DC coefficient is to be corrected), the process goes to Step S5003; otherwise, the process is terminated.

At Step S5003, a counter countDCL indicating the number of corrected DC coefficients is initialized to zero.

At Step S5004, a check is made as to whether or not a countDCL is 16 or more (that is, whether the DC coefficient has been corrected for all x's and y's {0≦x≦3, 0≦y≦3}), and if countDCL is 16 or more, the process is terminated; otherwise, goes to Step S5005.

At Step S5005, the level LDC(x, y) is corrected according to EQ. (50) below, countDCL is incremented by one, and the process roes to Step S5004.

$$LDC(x, y) = \begin{cases} RLDC(x, y) & \ldots \text{ if } (conditionB(idx, x, y) = \text{True}) \\ LDC(x, y) & \ldots \text{ else} \end{cases} \quad (50)$$

$$RLDC(x, y) = (ope1(RTDC(x, y), QsDC(x, y), x, y) \times Q(qp \,\%\, 6, 0, 0) + fintra \times \text{sign}(RTDC(x, y))) \times 2^{(16+qp/6)}) / 2^{(16+qp/6)} \quad (51)$$

$$x = \text{countDCL}\ \%4 \quad (52)$$

$$y = countDCL/4 \quad (53)$$

The explanation of the operation of the DC coefficient quantizing apparatus 1032 in accordance with the present embodiment is now completed.

According to the converting/quantizing apparatus 200 in the present embodiment as described above, effective reduction of I-frame flickering is achieved when a moving picture is encoded using not only I-frames but also using inter-frame prediction such as that in P- and B-frames, and even when a moving picture containing scenes in motion is encoded, as in Embodiment 1.

Embodiment 4

This embodiment will address a moving picture encoding apparatus of the invention employing a converting/quantizing apparatus capable of reducing I-frame flickering with a simpler configuration, unlike the converting/quantizing apparatus 200 in Embodiment 1 or 3 in which "the converting/quantizing apparatus 200 calculates a transform coefficient for a reference predictive error."

Since only the internal configuration of the converting/quantizing apparatus 200 differs from that in Embodiment 1 or 3, only the I-frame flickering suppression control apparatus 200 in accordance with the present embodiment will be described below for simplifying the explanation. (It will be easily recognized that the configuration of the I-frame flickering suppression control apparatus 300 may be either one in Embodiment 1 or 2.)

Figure 23:
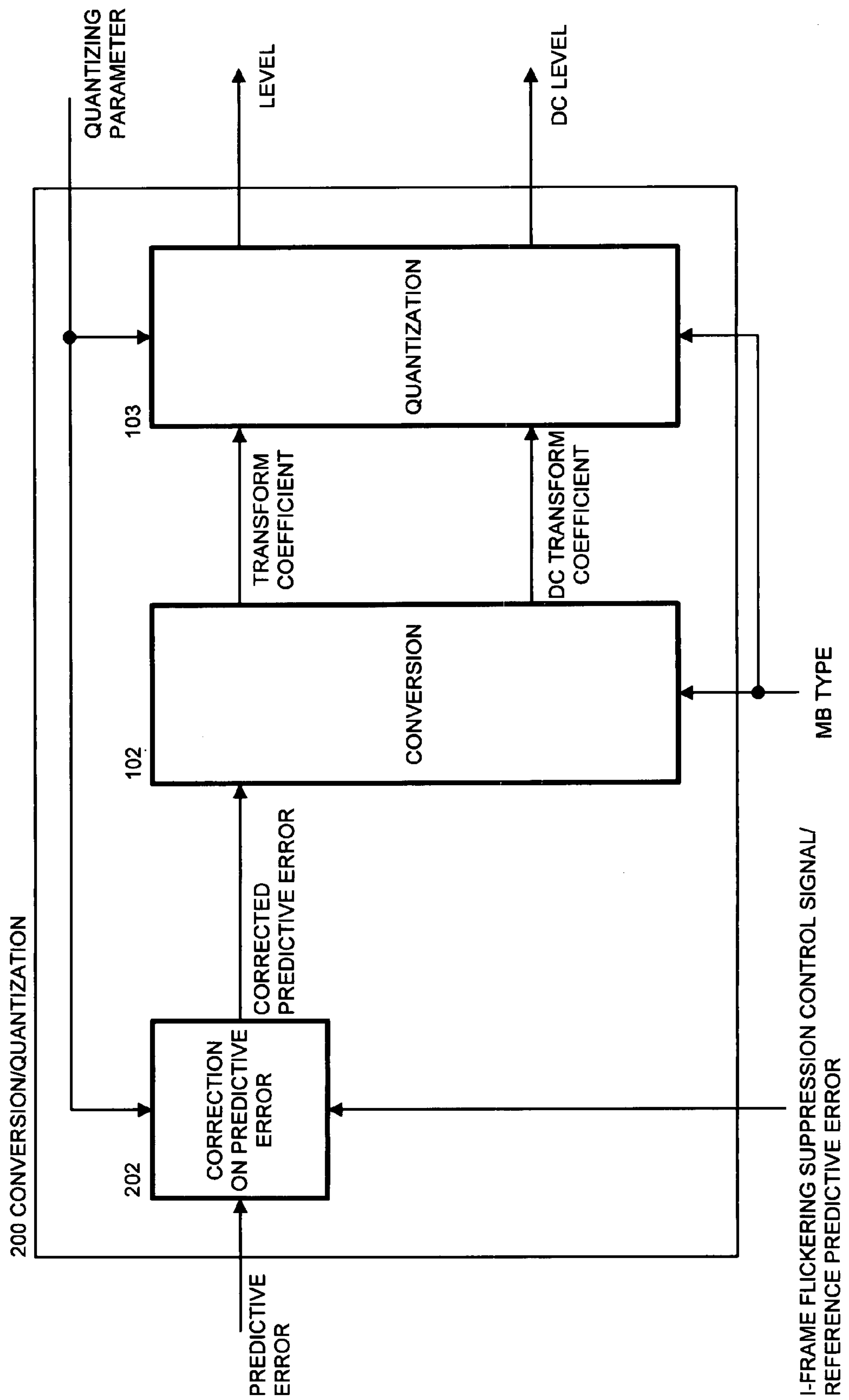
FIG. 23 is a block diagram of a converting/quantizing apparatus in Embodiment 4.

The configuration of the converting/quantizing apparatus 200 of the present embodiment is shown in FIG. 23.

The converting/quantizing apparatus 200 of the present embodiment comprises, in addition to the conventional components in FIG. 5, a predictive error correcting apparatus 202. The predictive error correcting apparatus 202 corrects a predictive error based on supplied I-frame flickering suppression control signal/reference predictive error, and supplies the corrected predictive error to the converting apparatus 102.

Figure 24:
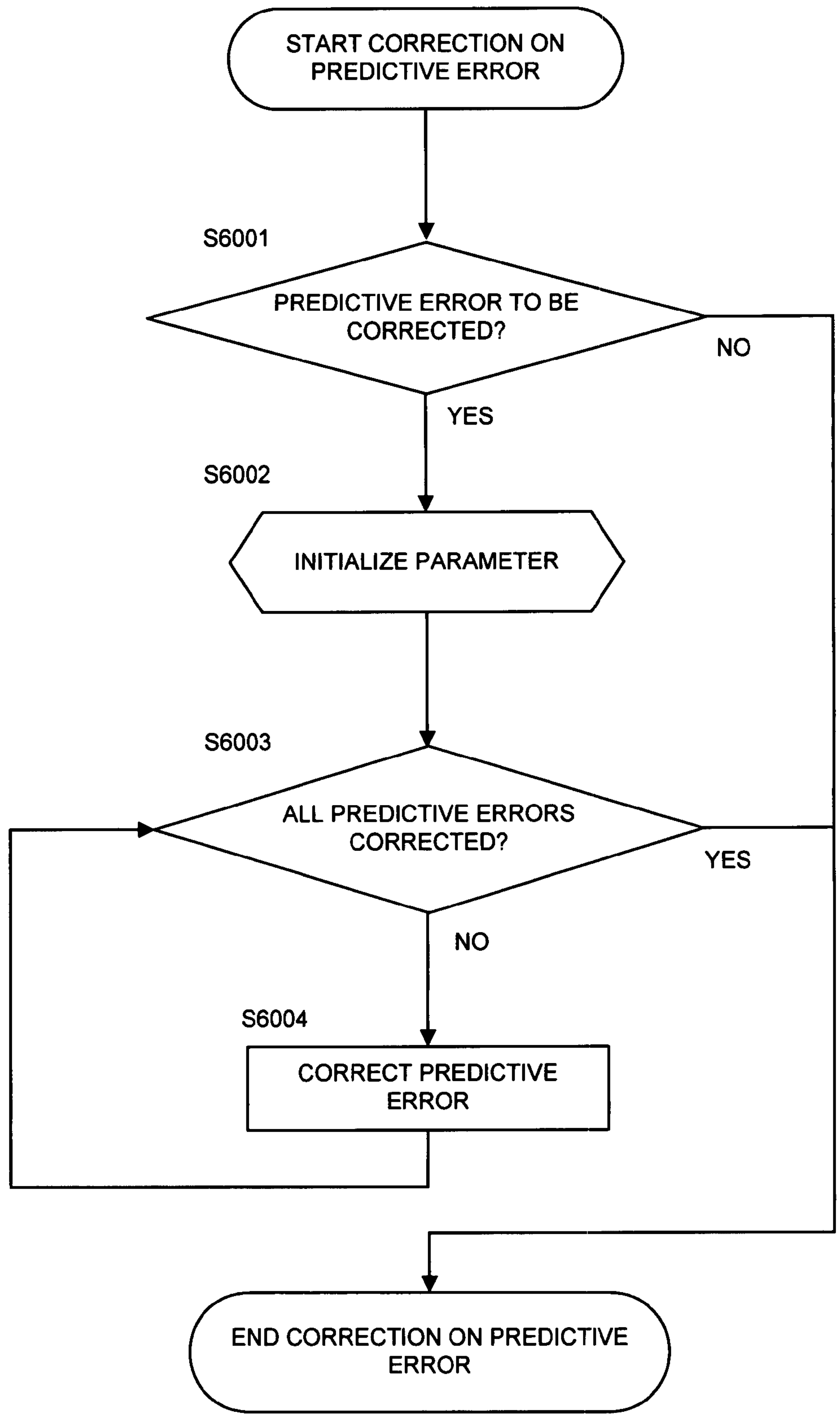
FIG. 24 is a flow chart of predictive error correction.

The apparatuses except the predictive error correcting apparatus 202 are similar to those in the conventional ones in FIG. 5. Therefore, only the operation of the predictive error correcting apparatus 202 will be addressed hereinbelow with reference to a flow chart in FIG. 24.

At Step S6001, a check is made as to whether the I-frame flickering suppression control signal IFlickerControl is zero or not. If IFlickerControl is not zero (that is, if a predictive error is to be corrected), the process goes to Step S6002; otherwise, the process is terminated.

At Step S6002, a counter countpe indicating the number of pixels of the corrected predictive error is initialized to zero.

At Step S6003, a check is made as to whether or not a countpe is 256 or more (that is, whether the predictive error has been corrected for all idx's, x's and y's $\{0 \leqq idx \leqq 15, 0 \leqq x \leqq 3, 0 \leqq y \leqq 3\}$), and if countpe is 256 or more, the process is terminated; otherwise, goes to Step S6004.

At Step S6004, the predictive error $pe_{idx}(x, y)$ $\{0 \leqq idx \leqq 15, 0 \leqq x \leqq 3, 0 \leqq y \leqq 3\}$ is corrected according to EQ. (54) below, countpe is incremented by one, and the process goes to Step S6003.

$$pe_{idx}(x, y) = \begin{cases} rpe_{idx}(x, y) & \dots \text{ if } (conditionC(idx, x, y) = \text{True}) \\ pe_{idx}(x, y) & \dots \text{ else} \end{cases} \quad (54)$$

$$conditionC(idx, x, y) = \begin{cases} \text{True} & \dots \text{ if } (|pe_{idx}(x, y) - rpe_{idx}(x, y)| \leq Qsdz3) \\ \text{false} & \dots \text{ else} \end{cases} \quad (55)$$

$$Qsdz3 = Qsdz1(0, 0)/(Tgain \times \beta) \quad (56)$$

$$idx = countpe/16 \quad (57)$$

$$num = countpe \% 16 \quad (58)$$

$$x = num \% 4 \quad (59)$$

$$y = num/4 \quad (60)$$

In EQ. (56), β is a real number equal to or greater than one (which is two in the present embodiment).

The explanation of the operation of the predictive error correcting apparatus 202 is now completed.

The reference predictive error here is a difference between the corrected reference image and intra-frame prediction as described in the first or second embodiment. On the other hand, the predictive error is a difference between an input MB and intra-frame prediction. That is, the converting/quantizing apparatus 200 according to the present embodiment can encode, in intra-encoding, the aforementioned corrected reference image in place of an image to be intra-encoded. However, not all images to be intra-encoded are replaced at discretion but only those images to be intra-encoded that are regarded as continuous in a temporal direction are replaced with corrected reference images as can be seen from EQ. (54).

According to the converting/quantizing apparatus 200 in the present embodiment described above, effective reduction of I-frame flickering is achieved when a moving picture is encoded using not only I-frames but also using inter-frame prediction such as that in P- and B-frames, and even when a moving picture containing scenes in motion is encoded, as in Embodiment 1.

Embodiment 5

While in the aforementioned embodiments, the invention applied to a moving picture encoding apparatus using intra-frame prediction has been addressed, it is applicable to one not using intra-frame prediction.

In such a case, the operation may be made with all the aforementioned intra-frame predicted values $pIntra_{idx}(x, y)$ defined as zero.

Moreover, the operation according to Embodiment 1 in this case (i.e., a case in which no intra-frame prediction is employed) uses, for the quantized value in intra-encoding, a quantized value obtained by applying conversion and quantization to an inter-encoded reconstructed image. It will be easily recognized that the configuration of the converting/quantizing apparatus 200 may be one according to Embodiment 3.

Furthermore, the operation according to Embodiment 2 in this case (i.e., a case in which no intra-frame prediction is employed) uses, for the quantized value in intra-encoding, a quantized value obtained by applying conversion and quantization to an inter-frame predicted image with a corrected-reference-image-producing reference frame. It will be easily recognized that the configuration of the converting/quantizing apparatus 200 may be one according to Embodiment 3.

In addition, the operation according to Embodiment 4 in this case (i.e., a case in which no intra-frame prediction is employed) uses, for the image to be intra-encoded, an inter-encoded reconstructed image or an inter-frame predicted image with a corrected-reference-image-producing reference frame.

While the aforementioned embodiments addresses a case in which the invention is applied only to brightness signals, it is applicable to a color-difference signals.

Embodiment 6

As can be clearly seen from the description above, the aforementioned embodiments may be constructed from hardware, but it is also possible to implement them using computer programs.

Figure 25:
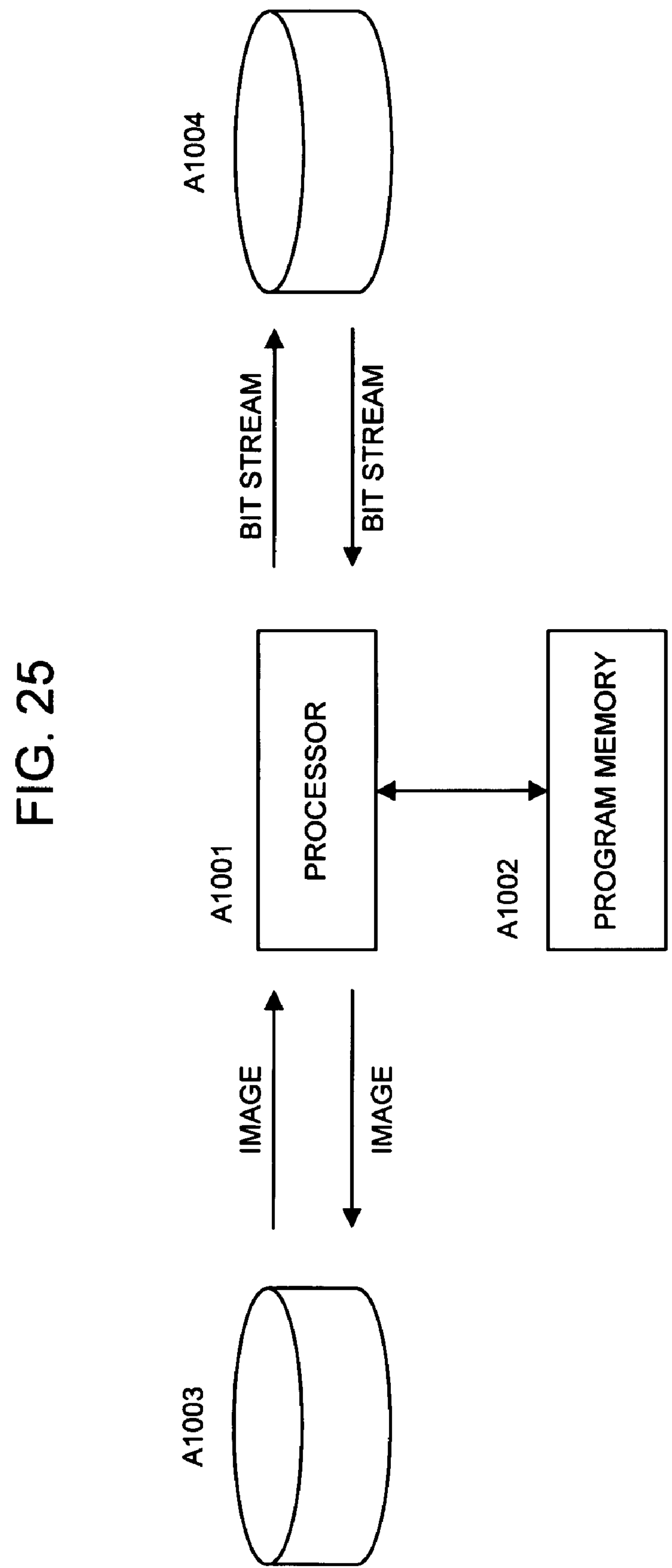
FIG. 25 is a block diagram of an information processing apparatus employing the present invention.

FIG. 25 is a general block configuration diagram of an information processing system with which the moving picture encoding apparatus in accordance with the present invention is implemented.

The information processing system shown in FIG. 25 consists of a processor A1001, a program memory A1002, and storage media A1003 and A1004. The storage media A1003 and A1004 may be separate storage media or storage regions in the same storage medium. Storage media that may be employed include a magnetic storage medium such as a hard disk.

Embodiment 7

Embodiment 7 will address a decoding apparatus in which a bit stream generated by the moving picture encoding apparatus according to any one of Embodiments 1-6 described above is input and an image obtained by decoding the bit stream is output.

Figure 28:
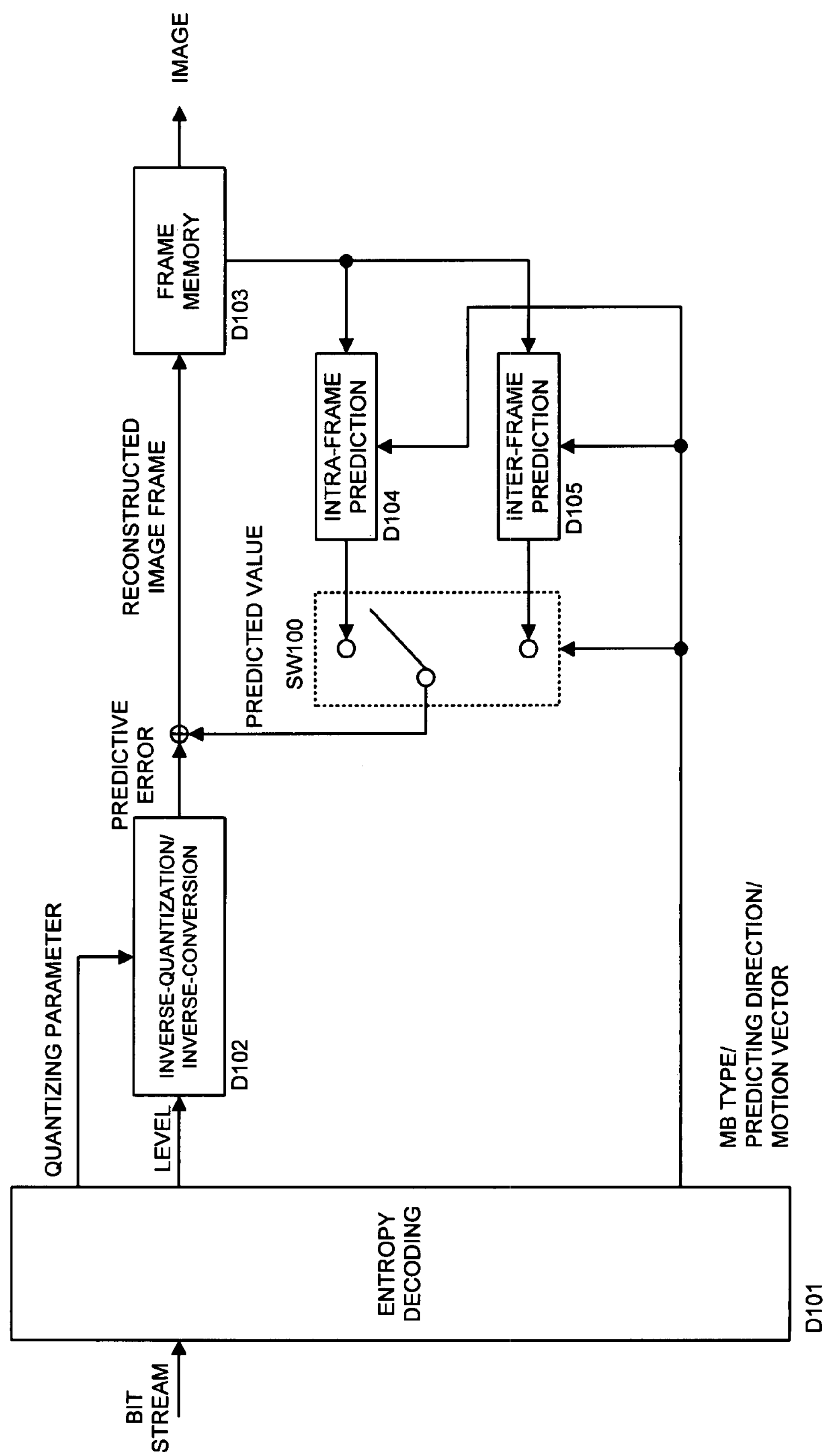
FIG. 28 is a block diagram of a moving picture decoding apparatus of the present invention.

Referring to FIG. 28, the decoding apparatus is comprised of an entropy decoding apparatus D101, an inverse-quantizing/inverse-converting apparatus D102, a frame memory D103, an intra-frame predicting apparatus D104, and an inter-frame predicting apparatus D105.

The entropy decoding apparatus D101 is for entropy-decoding a bit sequence comprising the level, quantizing parameter, intraMB type, interMB type, predicting direction, motion vector and the like multiplexed in a bit stream to recover original values.

The inverse-quantizing/inverse-converting apparatus D102 applies inverse-quantization and inverse-conversion to the level supplied by the entropy decoding apparatus D101 to bring it back into the original pixel space. The level brought back into the original pixel space is called a predictive error.

The predictive error is added with a predicted value supplied by SW100, and then stored in the frame memory D103 as a reconstructed image frame.

The frame memory D103 has a configuration in which the frame memory A 107, in-loop filtering apparatus 108, and frame memory B 109, which have been described regarding the moving picture encoding apparatus, are integrated together.

The frame memory D103 monitors the time at which a stored reconstructed image frame is displayed, and outputs a reconstructed image frame at its display time.

If the MB type supplied by the entropy decoding apparatus D101 is intraMB, the intra-frame predicting apparatus D104 produces an intra-frame predicted image from the reconstructed image frame stored in the frame memory 105 based on the supplied intraMB and predicting direction, as in the intra-frame predicting apparatus 110 in the encoding apparatus.

If the MB type supplied by the entropy decoding apparatus D101 is interMB, the inter-frame predicting apparatus D105 produces an inter-frame predicted image from the reconstructed image frame (reference frame) stored in the frame memory 105 based on the supplied interMB type and motion vector, as in the inter-frame predicting apparatus 111 in the encoding apparatus.

SW100 outputs the intra-frame predicted image supplied by the intra-frame predicting apparatus D104 as a predicted value if the MB type supplied by the entropy decoding apparatus D101 is intraMB, and outputs the inter-frame predicted image supplied by the inter-frame predicting apparatus D105 as a predicted value if the MB type is interMB.

According to the processing as described above, the moving picture decoding apparatus can decode an input bit stream to reconstruct an image.

The invention claimed is:

1. A moving picture encoding apparatus comprising:

a memory frame for storing a past P-frame relative to an image to be intra-encoded; and means for correcting a quantized value in intra-encoding using an inter-frame predicted image obtained by applying inter-frame prediction to said image to be intra-encoded with an image in said P-frame.

2. A moving picture encoding apparatus recited in claim 1, wherein said P-frame is a P-frame immediately before said image to be intra-encoded.

3. A moving picture encoding apparatus recited in claim 2, wherein said inter-frame predicted image is a reconstructed image obtained by applying inter-frame prediction, conversion, quantization, inverse-quantization, and inverse-conversion to an image to be intra-encoded with an image in said P-frame.

4. A moving picture encoding apparatus recited in claim 3, wherein a quantized value obtained by converting a difference between said image for use in correction and an intra-frame predicted value image and applying quantization thereto is used as a quantized value in intra-encoding.

5. A moving picture encoding apparatus recited in claim 4, wherein said quantization has a rounding-off quantizing property.

6. A moving picture encoding apparatus recited in claim 5, wherein correction on said quantized value in intra-encoding is applied only when a difference between a transform coefficient in intra-encoding and that obtained from said image for use in correction is equal to or smaller than a quantization dead-zone width in inter- encoding.

7. A moving picture encoding apparatus recited in claim 3, wherein a quantized value obtained by converting said image for use in correction and applying quantization thereto is used as a quantized value in intra-encoding.

8. A moving picture encoding apparatus recited in claim 7, wherein said quantization has a rounding-off quantizing property.

9. A moving picture encoding apparatus recited in claim 8, wherein correction on said quantized value in intra-encoding is applied only when a difference between a transform coefficient in intra-encoding and that obtained from said image for use in correction is equal to or smaller than a quantization dead-zone width in inter- encoding.

10. A moving picture encoding apparatus recited in claim 2, comprising means for intra-encoding a reconstructed image produced by applying inter-frame prediction, conversion, quantization, inverse-quantization, and inverse-conversion to an image to be intra-encoded with an image in said P-frame.

11. A moving picture encoding apparatus recited in claim 2, comprising means for intra-encoding an inter-frame predicted image produced by applying inter-frame prediction to an image to be intra-encoded with an image in said P-frame.

12. A moving picture encoding apparatus recited in claim 10 or claim 11, wherein said intra-encoding is applied when a difference between said produced image and an image to be intra-encoded is equal to or smaller than a quantization dead-zone width in inter-encoding in a pixel space.

13. A moving picture encoding method comprising:

producing an inter-frame predicted image by applying inter-frame prediction to an image to be intra-encoded with an image in a past P-frame relative to the image to be intra- encoded; and correcting a quantized value in intra-encoding using said inter-frame predicted image.

14. A moving picture encoding method recited in claim 13, wherein said P-frame is a P-frame immediately before said image to be intra-encoded.

15. A moving picture encoding method recited in claim 14, wherein said inter-frame predicted image is a reconstructed image obtained by applying inter-frame prediction, conversion, quantization, inverse-quantization, and inverse-conversion to an image to be intra-encoded with an image in a P-frame.

16. A moving picture encoding method recited in claim 15, wherein a quantized value obtained by converting a difference between said image for use in correction and an intra-frame predicted value image and applying quantization thereto is used as a quantized value in intra-encoding.

17. A moving picture encoding method recited in claim 16, wherein said quantization has a rounding-off quantizing property.

18. A moving picture encoding method recited in claim 17, wherein correction on said quantized value in intra-encoding is applied only when a difference between a transform coefficient in intra-encoding and that obtained from said image for use in correction is equal to or smaller than a quantization dead-zone width in inter- encoding.

19. A moving picture encoding method recited in claim 15, wherein a quantized value obtained by converting said image for use in correction and applying quantization thereto is used as a quantized value in intra-encoding.

20. A moving picture encoding method recited in claim 19, wherein said quantization has a rounding-off quantizing property.

21. A moving picture encoding method recited in claim 20, wherein correction on said quantized value in intra-encoding is applied only when a difference between a transform coefficient in intra-encoding and that obtained from said image for use in correction is equal to or smaller than a quantization dead-zone width in inter- encoding.

22. A moving picture encoding method recited in claim 14, comprising intra-encoding a reconstructed image produced by applying inter-frame prediction, conversion, quantization, inverse-quantization, and inverse-conversion to an image to be intra-encoded with an image in said P-frame.

23. A moving picture encoding method recited in claim 14, comprising intra-encoding an inter-frame predicted image produced by applying inter-frame prediction to an image to be intra-encoded with an image in said P-frame.

24. A moving picture encoding method recited in claim 22 or claim 23, wherein said intra-encoding is applied when a difference between said produced image and an image to be intra-encoded is equal to or smaller than a quantization dead-zone width in inter-encoding in a pixel space.

25. A non-transitory computer readable medium storing a program for causing an information processing apparatus to perform moving picture encoding, wherein said program causes said information processing apparatus to act as:

means for producing an inter-frame predicted image by applying inter-frame prediction to an image to be intra-encoded with an image in a past P-frame relative to the image to be intra-encoded; and means for correcting a quantized value in intra-encoding using said inter-frame predicted image.

26. A non-transitory computer readable medium recited in claim 25, wherein said P-frame is a P-frame immediately before said image to be intra-encoded.

27. A non-transitory computer readable medium recited in claim 26, wherein said inter-frame predicted image is a reconstructed image obtained by applying inter-frame prediction, conversion, quantization, inverse-quantization, and inverse-conversion to an image to be intra-encoded with an image in a P-frame.

28. A non-transitory computer readable medium recited in claim 27, wherein a quantized value obtained by converting said image for use in correction and applying quantization thereto is used as a quantized value in intra-encoding.

29. A non-transitory computer readable medium recited in claim 28, wherein said quantization has a rounding-off quantizing property.

30. A non-transitory computer readable medium recited in claim 29, wherein correction on said quantized value in intra-encoding is applied only when a difference between a transform coefficient in intra-encoding and that obtained from said image for use in correction is equal to or smaller than a quantization dead-zone width in inter- encoding.

31. A non-transitory computer readable medium recited in claim 27, wherein a quantized value obtained by converting a difference between said image for use in correction and an intra-frame predicted value image and applying quantization thereto is used as the quantized value in intra-encoding.

32. A non-transitory computer readable medium recited in claim 31, wherein said quantization has a rounding-off quantizing property.

33. A non-transitory computer readable medium recited in claim 32, wherein correction on said quantized value in intra-encoding is applied only when a difference between a transform coefficient in intra-encoding and that obtained from said image for use in correction is equal to or smaller than a quantization dead-zone width in inter-encoding.

34. A non-transitory computer readable medium recited in claim 26, wherein said program causes said information processing apparatus to act as:

means for intra-encoding a reconstructed image produced by applying inter- frame prediction, conversion, quantization, inverse-quantization, and inverse-conversion to an image to be intra-encoded with an image in said P-frame.

35. A non-transitory computer readable medium recited in claim 26, wherein said program causes said information processing apparatus to act as:

means for intra-encoding an inter-frame predicted image produced by applying inter-frame prediction to an image to be intra-encoded with an image in said P-frame.

36. A non-transitory computer readable medium recited in claim 34 or claim 35, wherein: said intra-encoding is applied when a difference between said produced image and an image to be intra-encoded is equal to or smaller than a quantization dead-zone width in inter-encoding in a pixel space.

37. A system for encoding/decoding a moving picture comprising:

a memory frame for storing a past P-frame relative to an image to be intra- encoded;

means for correcting a quantized value in intra-encoding using an inter-frame predicted image obtained by applying inter-frame prediction to said image to be intra-encoded with an image in said P-frame;

means for intra-encoding based on said corrected quantized value; and decoding means for decoding said encoded data.

38. A method of encoding/decoding a moving picture comprising steps of:

producing an inter-frame predicted image by applying inter-frame prediction to an image to be intra-encoded with an image in a past P-frame relative to the image to be intra- encoded;

correcting as quantized value in intra-encoding using said inter-frame predicted image;

intra-encoding based on said corrected quantized value; and decoding said encoded data.

* * * * *